US008423420B1

(12) United States Patent
Bhosle et al.

(10) Patent No.: US 8,423,420 B1
(45) Date of Patent: Apr. 16, 2013

(54) METHOD AND MEDIA FOR DUPLICATE DETECTION IN AN ELECTRONIC MARKETPLACE

(75) Inventors: Amit Bhosle, Bellevue, WA (US); Ashish Agrawal, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 12/683,519

(22) Filed: Jan. 7, 2010

(51) Int. Cl.
*G06Q 30/00* (2012.01)

(52) U.S. Cl.
USPC ........................................................ 705/26.1

(58) Field of Classification Search ............... 705/26.1, 705/27.1
See application file for complete search history.

(56) References Cited

U.S. PATENT DOCUMENTS

| | | | |
|---|---|---|---|
| 5,873,069 A | 2/1999 | Reuhl et al. | |
| 7,054,841 B1* | 5/2006 | Tenorio | 705/57 |
| 7,146,416 B1 | 12/2006 | Yoo et al. | |
| 7,249,058 B2 | 7/2007 | Kim et al. | |
| 7,318,043 B1* | 1/2008 | Silver et al. | 705/26.81 |
| 7,577,582 B1 | 8/2009 | Ojha et al. | |
| 7,637,426 B1 | 12/2009 | Green | |
| 7,647,309 B1 | 1/2010 | Bar | |
| 8,055,548 B2 | 11/2011 | Staib et al. | |
| 2001/0032163 A1 | 10/2001 | Fertik et al. | |
| 2002/0052806 A1 | 5/2002 | Hodson et al. | |
| 2002/0065737 A1 | 5/2002 | Aliabadi et al. | |
| 2002/0143655 A1* | 10/2002 | Elston et al. | 705/26 |
| 2002/0152135 A1 | 10/2002 | Beeri et al. | |
| 2002/0174076 A1 | 11/2002 | Bertani | |
| 2002/0178014 A1 | 11/2002 | Alexander | |
| 2003/0033231 A1* | 2/2003 | Turner et al. | 705/36 |
| 2003/0069740 A1 | 4/2003 | Zeidman | |
| 2003/0083961 A1* | 5/2003 | Bezos et al. | 705/27 |
| 2003/0105682 A1 | 6/2003 | Dicker et al. | |
| 2004/0158496 A1* | 8/2004 | Tenorio | 705/26 |
| 2005/0159974 A1 | 7/2005 | Moss et al. | |
| 2005/0261987 A1* | 11/2005 | Bezos et al. | 705/27 |
| 2006/0059062 A1 | 3/2006 | Wood et al. | |
| 2006/0089907 A1* | 4/2006 | Kohlmaier et al. | 705/40 |
| 2006/0095431 A1 | 5/2006 | Nash | |
| 2006/0136307 A1* | 6/2006 | Hays et al. | 705/26 |
| 2006/0161480 A1* | 7/2006 | Christensen | 705/26 |
| 2007/0022007 A1 | 1/2007 | Lawe | |

(Continued)

OTHER PUBLICATIONS

Dec. 2009—http://www.magentocommerce.com/boards/view thread/68777.*

(Continued)

*Primary Examiner* — Matthew Zimmerman
(74) *Attorney, Agent, or Firm* — Lee & Hayes, PLLC

(57) ABSTRACT

A shared "universal" virtual shopping cart ("the cart") may be provided by a host to enable information sharing between multiple disparate electronic marketplaces provided by various merchants. The host may obtain user information via the cart to improve interactions with a user. The host may recommend an item to the user that is offered at a lower price and related to an item retained in the user's cart. The host may also recommend items based on a user's purchase history, such as complementary items (e.g., up-sell items) and items other users may recommend. In some aspects, the host may compile best selling lists based on data from multiple electronic marketplaces. The host may also perform user specific operations such as indicate an item in a cart is a duplicate of a previous purchase and monitor a price and/or available quantities of an item in the cart.

24 Claims, 16 Drawing Sheets

U.S. PATENT DOCUMENTS

| | | | |
|---|---|---|---|
| 2007/0073580 A1 | 3/2007 | Perry et al. | |
| 2007/0078724 A1* | 4/2007 | Haynes et al. | 705/26 |
| 2007/0112641 A1* | 5/2007 | Turner et al. | 705/26 |
| 2007/0150361 A1 | 6/2007 | Kreiner et al. | |
| 2007/0271149 A1 | 11/2007 | Siegel et al. | |
| 2007/0276688 A1 | 11/2007 | Sun et al. | |
| 2007/0299743 A1 | 12/2007 | Staib et al. | |
| 2008/0004987 A1 | 1/2008 | Choe et al. | |
| 2008/0021767 A1* | 1/2008 | Benson et al. | 705/10 |
| 2008/0103941 A1* | 5/2008 | Hussain | 705/28 |
| 2009/0216549 A1* | 8/2009 | Causey et al. | 705/1 |
| 2009/0240601 A1 | 9/2009 | Hanks et al. | |
| 2009/0254447 A1 | 10/2009 | Blades | |
| 2009/0292605 A1 | 11/2009 | Kniaz et al. | |
| 2009/0299875 A1 | 12/2009 | Zhu et al. | |
| 2010/0049663 A1 | 2/2010 | Kane, Jr. et al. | |
| 2010/0076867 A1* | 3/2010 | Inoue et al. | 705/27 |
| 2010/0131386 A1* | 5/2010 | Shiely et al. | 705/26 |
| 2010/0250336 A1 | 9/2010 | Selinger et al. | |
| 2011/0010324 A1 | 1/2011 | Bolivar et al. | |
| 2011/0029405 A1 | 2/2011 | Cronin et al. | |

OTHER PUBLICATIONS

Office Action for U.S. Appl. No. 12/683,501, mailed on Apr. 7, 2011, Bhosle et al., "Electronic Marketplace Deal Finder," 11 pages.

Final Office Action for U.S. Appl. No. 12/683,501, mailed on Dec. 9, 2011, Amit Bhosle et al., "Electronic Marketplace Deal Finder", 18 pages.

Final Office Action for U.S. Appl. No. 12/683,548, mailed on Sep. 26, 2011, Amit Bhosle et al., "Electronic Marketplace Recommendations", 18 pages.

Non-Final Office Action for U.S. Appl. No. 12/683,548, mailed on Sep. 26, 2011, Amit Bhosle, "Electronic Marketplace Recommendations".

Seagal, "The coming electronic commerce (r)evolution", Planning Review, vol. 23, No. 6, Nov./Dec. 1995, pp. 21-27.

Stahl, "Combining Case-Based and Similarity-Based Product Recommendation", German Research Center for Artificial Intelligence(DFKI), Sep. 4-7, 2006, vol. 4106, 15 pages.

* cited by examiner

METHOD AND MEDIA FOR DUPLICATE DETECTION IN AN ELECTRONIC MARKETPLACE

BACKGROUND

The Internet has evolved from primarily a vast repository of reference information to a conduit for electronic commerce. People are able to perform complex banking functions, purchase goods and services, and engage in many other exchanges with businesses or other people using sophisticated websites. This evolution has been fueled in part by increased security in these exchanges and increased behavioral acceptance of sharing personal information (e.g., payment information, etc.) with another party.

Many merchants offer their goods and/or services to consumers via electronic marketplaces (e.g., websites, peer-to-peer systems, etc.). Some merchants may host their own electronic marketplace while others may use a third party to transact goods, such as a host of an auction marketplace. Regardless of a configuration and host of each marketplace, the marketplaces are isolated from one another for various reasons, one of which is an inherent competition between the marketplaces. Another reason, as previously mentioned, is to increase security and privacy of users. Yet another reason is a difficulty in sharing information between hosts that when each host has a unique system (e.g., legacy system) that is inflexible and cannot easily share information.

In many instances, merchants may use a basic transaction model to enable users to purchase, receive or otherwise consume items (e.g., goods or services). For instance, the merchants may provide a platform for users to browse a catalog of items offered by the merchant. This platform may enable users to search for items and view item details. A user may select desired items to inclusion in a virtual shopping cart, which may facilitate a later purchase of the items. Users may then navigate to their shopping cart for a respective merchant when they desire to purchase selected items. The shopping cart may allow the user to add items, adjust quantities, or remove items. Next, the user may enter a checkout process for the items in the shopping cart. In some instances, the checkout process may be hosted by a third party that offers a payment processing system. After a transaction for the items, the merchant initiates fulfillment of the purchased items.

During user interactions with a merchant in an electronic marketplace, the merchant may be able to collect significant amounts of information from the user that may include user preferences of items, payment information, and other user preferences. For example, the merchant may store a purchase history of the user and then, at a later time, offer the user special discounts on items that relate to the user's purchase history. However, this information is constrained to the merchant and interactions with the merchant's electronic marketplace. Users may benefit from a merchant's use of stored information by receiving customized services, special discounts, or other information that is tailored to the user based at least in part on information collected from the user to enable a rich experience from an interaction between the user and the merchant.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
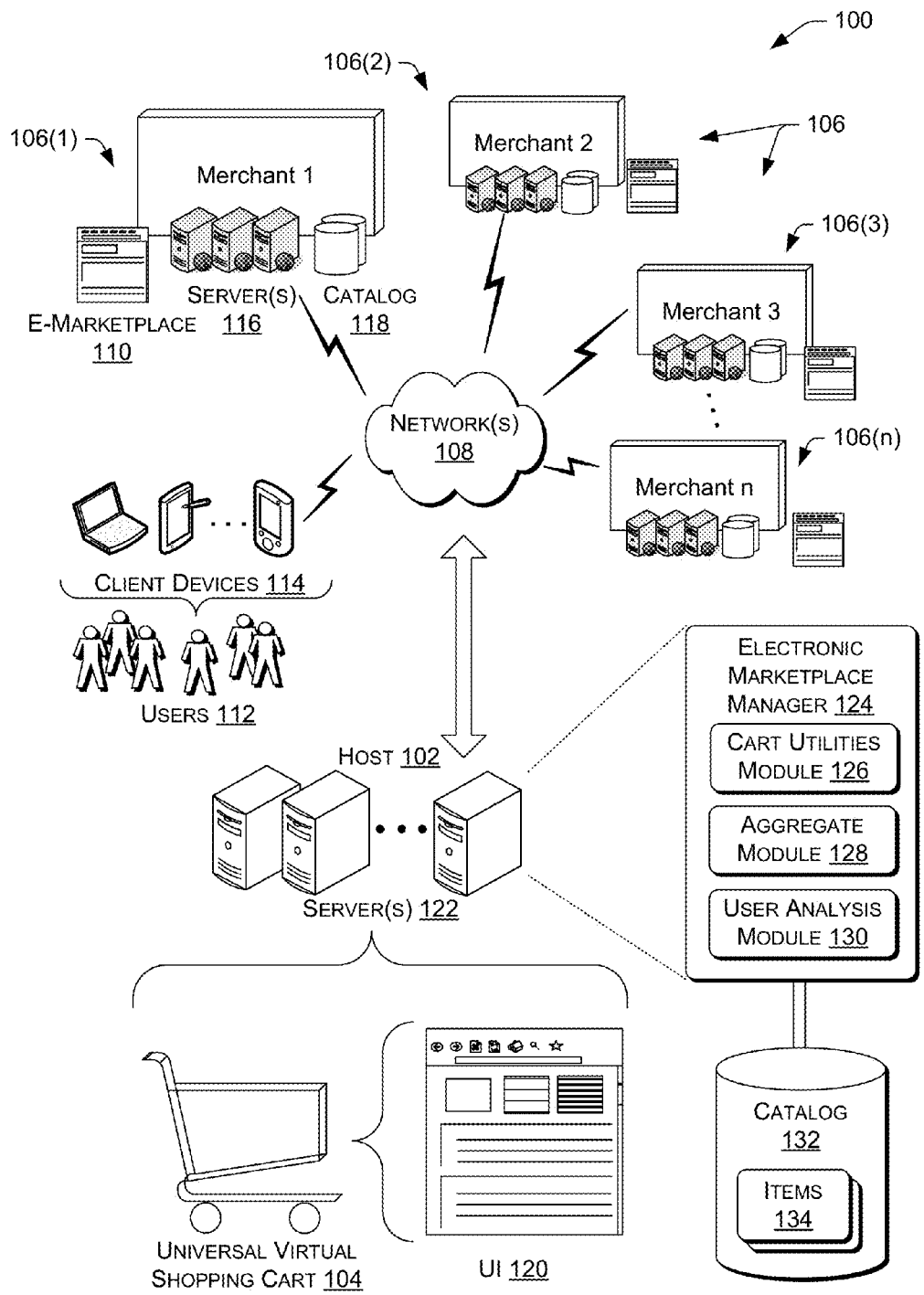
FIG. 1 is a schematic diagram of an illustrative computing environment to aggregate information from various electronic marketplaces.

Information may be collected by a centralized host to capture user interaction with multiple electronic marketplaces and ultimately be used to benefit users. The host may be able to provide additional services or improve interactions with the users based on the collected information. For example, and without limitation, the host may provide comparison shopping across multiple merchants, perform transactional analysis across a combined transactional history, and provide recommendations based on aggregated data from the merchants.

A shared or "universal" virtual shopping cart (referred to herein as a "cart") is disclosed to enable information sharing between multiple disparate electronic marketplaces (e.g., network-accessible merchant sites). The cart may be made available for use by users via multiple disparate electronic marketplaces. In this way, a user may visit a first site and select an item for inclusion in the cart, then visit a second site that is hosted by a different merchant than the first site and add a second item into the cart. When the user is finished shopping, the user may purchase the items in the cart in a single transaction. A host of the cart may then transmit payment information to the merchants associated with the respective purchased items to initiate fulfillment of the items to the user. The host of the cart may also store the transaction details, such as the items involved in the transaction and so forth. Items that remain in the cart (i.e., those items not selected for purchase) may be preserved in the cart to enable a future transaction, analysis, or other operations.

The host may use the transaction details to provide additional services and to improve interactions with the user. For example, the host may enable the user to search for alternative items that are the same or similar to items in the cart but offered for a lower price. The host may also recommend items based on a user's purchase history with various merchants and/or may recommend (i.e., up-sell) items that are deemed complementary to the items in a user's cart, possibly via a targeted advertisement. The host may also aggregate sales across multiple users to compile best selling lists that are more inclusive than those possible for a single electronic marketplace. The host may also perform user specific operations such as indicate when an item in a cart is a duplicate of a previous purchase and/or monitor and update a price and/or available quantities of an item in the cart, which may ultimately may trigger a transaction involving the item.

To perform some or all of the features discussed above, the host may conduct preliminary data processing on items in the merchants' catalogs, transactional history, or other data collected by the cart. For example, the host may select a common catalog of items that is used to link similar items across multiple merchants and/or electronic marketplaces. The common catalog may then enable comparisons of items that include different model numbers, titles, colors, etc., but that are similar in many ways. Further, the host may provide an application program interface (API) or other communication data interface or techniques to enable merchants to interact with the cart. For example, browser cookies may be used to pass user selected items from a merchant's electronic marketplace to the cart. The user, the user's cart, and the merchants may each be identified with unique identifiers (IDs) to enable passing information and tracking item activity with the cart.

The techniques and systems described herein may be implemented in a number of ways. Example implementations are provided below with reference to the following figures.

Illustrative Environment

FIG. 1 is a schematic diagram of an illustrative computing environment 100 to aggregate information from various electronic marketplaces. The environment 100 may include a host 102 to employ a universal virtual shopping cart 104 (i.e., a "cart") that enables aggregation of transactional data associated with the cart and performs various user-based analyses of items associated with the cart.

In various embodiments, the host 102 may be in communication with merchants 106(1), 106(2), 106(3), . . . , 106(n) through one or more network(s) 108. Each of the merchants 106(1)-(n), such as a first merchant 106(1), may provide an electronic marketplace 110, via the network 108 that enables users 112 to interact with the first merchant using respective client devices 114. The client devices 114 may include a personal computer, an electronic book reader (e-book reader), a tablet computer, a mobile telephone, a personal digital assistant (PDA), a television, a set top box, a gaming console, or another electronic device.

The electronic marketplace 110 may be hosted by servers 116 that make a catalog 118 of items available to the users 112, who may ultimately acquire items from the catalog. Each of the merchants 106 (e.g., a second merchant 106(2), a third merchant 106(3), . . . , and a last merchant 106(n)) may each include unique electronic marketplace, hosted on one or more servers and including a unique item catalog.

In accordance with various embodiments, the users 112 may browse the merchant's catalog 118 via the electronic marketplace 110. When one of the users 112 identifies a product, service, or other element (collectively an "item"), then the user may select the item for inclusion in the cart 104. The users 112 may interact with the cart 104 via a user interface 120. The merchant (e.g., the first merchant 106(1)) may then transmit information via the network 108 to the host 102 to enable the host to update the cart 104 with the respective item information. The user may select items from other merchants 106(2)-(n) and ultimately place selected items in the cart. The host 102 may store item information associated with the cart 104 and each of the users 112 to create transactional history, which may be analyzed and/or aggregated for various purposes as disclosed herein.

The host 102 may perform various operations by processing, via servers 122, transactional data generated by the cart 104. To perform these functions, the server(s) 122 may include an electronic market manager 124, which may include a cart utilities module 126, an aggregate module 128, and a user analysis module 130. The servers 122 may be in communication with a common catalog 132 which enables mapping item information of common items 134 to corresponding items in the various catalogs 118 of the merchants 106 (and vice versa). For instance, a particular bicycle offered by the first merchant 106(1) in the merchant's catalog 118 may be mapped to the same or a very similar bicycle in the common catalog 134 of the host 102. In some instances, the host 102 may actually use a catalog of one of the merchants 106(1)-(n) as the common catalog 132.

In accordance with various embodiments, the cart utilities module 126 may perform mapping of the merchant catalogs (e.g., the catalog 118, etc.) to the common catalog 132 and may manage various cart operations such as storage of transactional data, display of a user interface 120, and other cart operations. The aggregate module 128 may perform transactional analysis for all the users 112 (cumulative) or a portion thereof, such as individual users or a group of similar users. The aggregate module 128 may then use this information to generate best seller information and provide data for use by the user analysis module 130. The user analysis module 130 may perform monitoring functions for items in the cart 104, may detect duplicate items based on user transaction history, may find items similar to items in the cart that are offered at a lower price, and may provide various recommendations to the user based in part on user transactional history.

Figure 2:
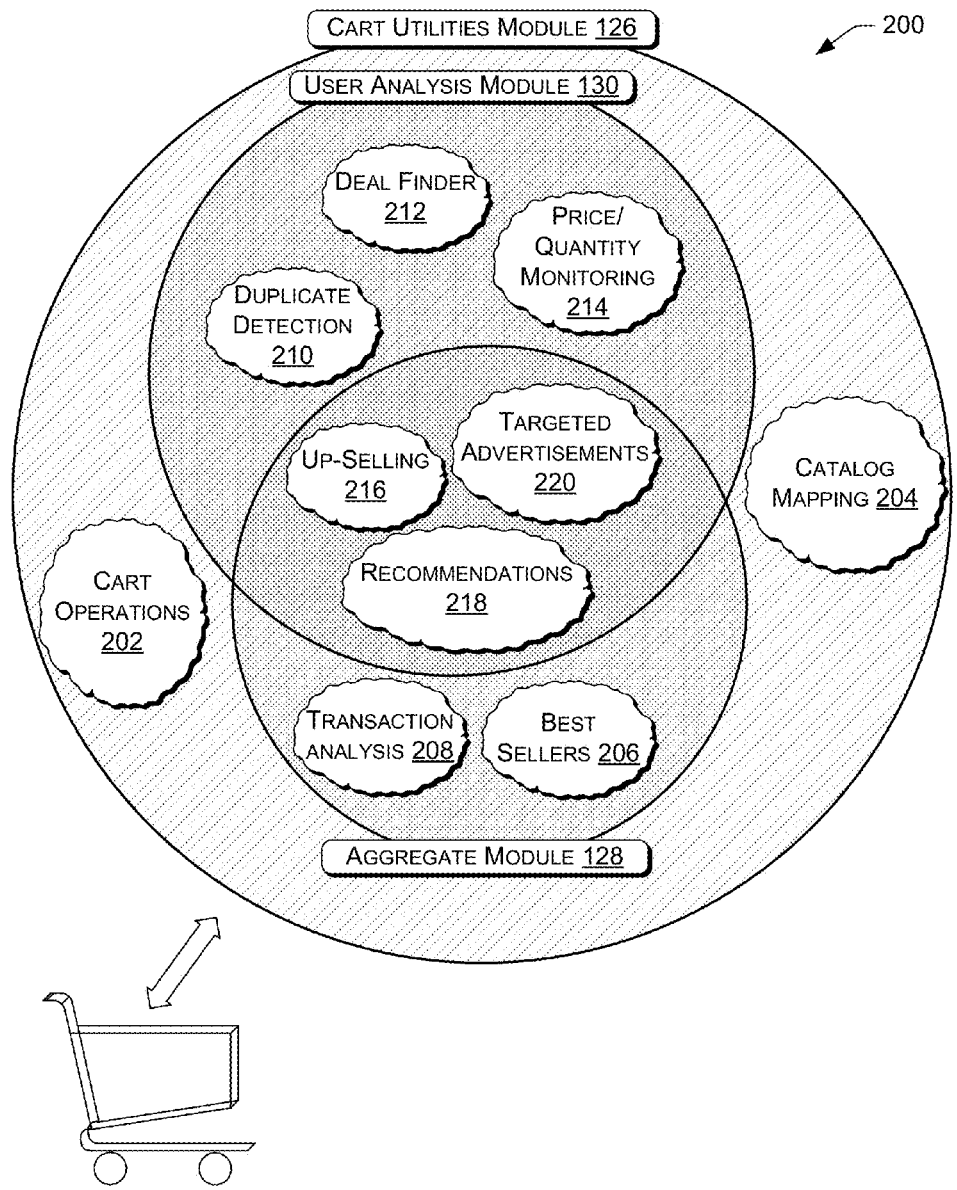
FIG. 2 is a Venn diagram showing relationships of tasks performed by an electronic marketplace manager and a various modules used to perform the respective tasks.

FIG. 2 is a Venn diagram 200 showing relationships of tasks performed by the electronic marketplace manager 124. FIG. 2 also illustrates the various modules of the electronic marketplace manager 124 used to perform the respective tasks. The various tasks may be performed using transactional data received by user interaction with the cart 104.

In various embodiments, the cart utilities module 126 may perform general cart operations 202 which may include data storage and analysis of transactional information of selected items that are included in the cart. For example, the cart operations 202 may enable receiving an item selection from a merchant's electronic marketplace for inclusion in the cart 104, tracking items in the cart, initiating transactions for the items in the cart, notifying merchants when items are transacted in the cart, and so forth. In addition, the cart utilities module 126 may perform catalog mapping 204 to map items from the merchant's catalog(s) 118 to the items 134 in the common catalog 132. The common catalog may be selected from any available catalog, such as a generic catalog, a merchant's catalog, or other catalogs. By mapping items to the common catalog 132, items may be compared across different catalogs via the common catalog, and thus enable the aggregate module 126 and the user analysis module 130 to perform functions that extract data from the various merchant catalogs 118.

As shown in FIG. 2, the aggregate module 126 may perform various tasks in combination with the cart utilities module 126 and/or the user analysis module 130. The aggregate module 128 may use data from the cart operations 202 and/or the catalog mapping 204 to perform transaction analysis 206 and compile best sellers lists 208. The transactional analysis 206, similar to the tasks performed by the cart utilities module 126, may perform processes that are used by the user analysis module 130 to ultimately provide data to the users 112.

The user analysis module 130 may perform duplicate detection 210, deal finding 212, and/or price/available quantity monitoring 214 based on data provided by the cart utilities module 126. The duplicate detection 210 may be performed by querying individual user's transaction history to identify acquired items that are similar to items in the cart 104, and thus to provide information to the user (e.g., a warning, item attributes, etc.). The deal finding 212 and the price/available quantity monitoring 214 may perform queries against the merchants catalog 118 based on items in the cart 104. These features may enable a user to comparison shop across the multiple merchants 106 without leaving the user interface 120 associated with the cart 104.

In some embodiments, the user analysis module 130 may perform various recommendation processes in concert with data obtained from the aggregate module 126 and/or the cart utilities module 126. The user analysis module 130 may enable up-selling, which is a presentation or offer of complementary items to a user based on an item in the cart 104. In addition or in an alternative, the user analysis module 130 may provide recommendations 218 and/or targeted advertising 220 to a user based on transactional history of the user captured by the cart operations 202. This data may be obtained in part by the transaction analysis 208, which may provide information such as items that users with a similar transaction history have purchased.

Illustrative Interfaces

FIGS. 3-6 provide illustrative interfaces that show possible presentations and implementations associated with the cart 104 of the various processes and tasks performed by the electronic marketplace manager 124. The interfaces are described with reference to the various components referenced in FIGS. 1-2. The interfaces may be made accessible to the users 112 via the computing devices 114.

Figure 3:
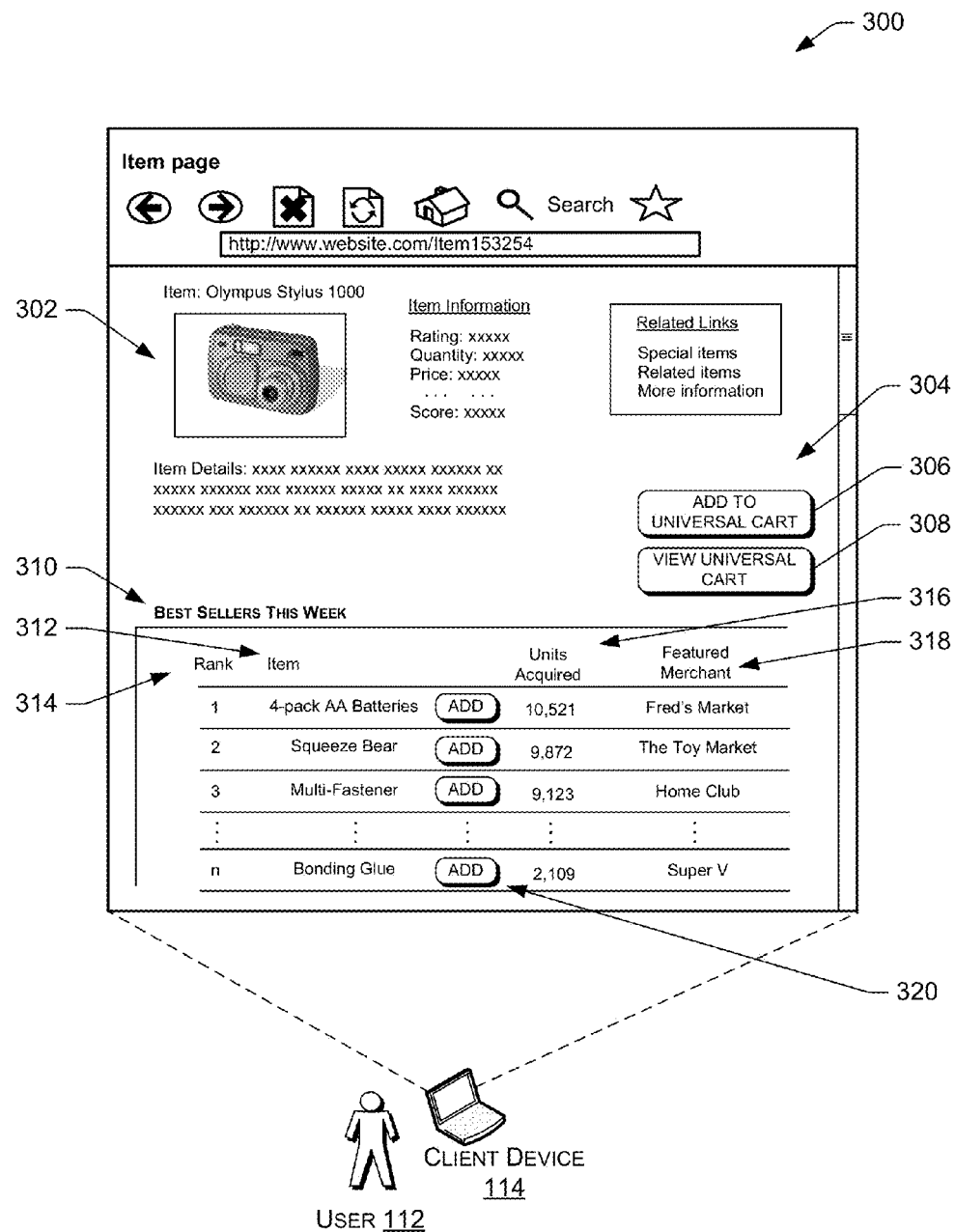
FIG. 3 is an illustrative interface of a merchant's electronic marketplace to provide access to a universal shopping cart that provides cross-marketplace best seller information.

FIG. 3 is an illustrative interface 300 of a merchant's electronic marketplace to provide access to the cart 104 and provide cross-marketplace best seller information. The interface 300 may include catalog information 302 for a catalog (e.g., the catalog 118, etc.) for an item or other information related to the electronic marketplace. The catalog information may include navigational information, user commentary, or other text, links, or data to enable the user 112 to interact with the catalog of one of the merchants 106.

In various embodiments, the interface 300 may include cart links 304. The cart links 304 may include an add-to-cart link 306 and a view-cart link 308 to enable the user to interact with the cart 104. For example, the user 112 may locate an item that the user desires to acquire via the interface 300. The user 112 may then select the add-to-cart link 306 to add the item (using item details) to the cart 104. As illustrated in FIG. 1, the cart 104 is provided by the host 102 and may require a data transmission from the merchant to the host to populate the cart with the respective item. The user 112 may select the view-cart link 308, meanwhile, to view the cart 104 and any items listed in the cart.

In some embodiments, the interface 300 may include a best seller section 310 to list best selling items or other priority items selected from a similar criteria such as recent sellers, hot items, new items, and so forth. The items in the best seller section 310 may be selected based on outputs of the various modules of the electronic marketplace manager 124, such as the aggregate module 126. In some instances, the best seller section 310 may include best-selling merchants of a single item, such as the illustrated camera. For instance, this section may list, in order, the ten merchants having sold the highest number of the illustrated camera.

In various embodiments, the best seller section 310 may list items and various data that may include a rank 312, an item name 314, a unit acquired quantity 316, and a featured merchant 318. The featured merchant 318 may be selected from the merchants 106 that offer the item to the users 112. In addition, an add-to-cart button 320 may be associated with each of the items to enable the user 112 to add any of the items to the cart 104. In various embodiments, the best seller section may be made accessible at various locations in the electronic marketplaces of the merchants 106, such as at a home page, item pages, a dedicated page, or other pages independent of the merchants 106.

Figure 4:
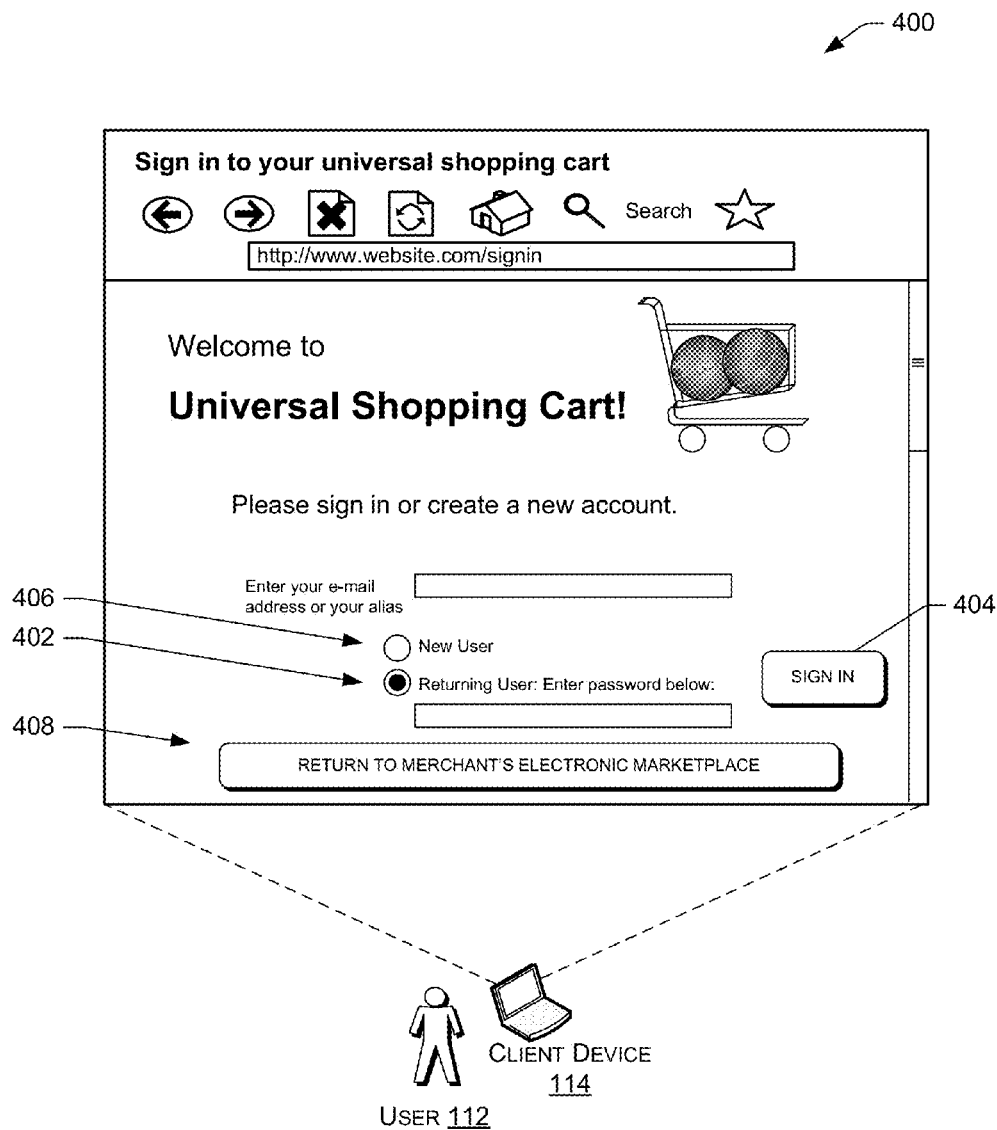
FIG. 4 is an illustrative interface to provide access to a universal shopping cart.

FIG. 4 is an illustrative interface 400 to provide access to the cart 104. The interface 400 may be navigable from the view-cart link 308 of FIG. 3 and/or by direct access to a site provided by the host 102 via the servers 122. The interface 400 may provide a sign-in selector 402 to enable the user 112 to sign in via a sign in button 404 and access the cart 104. In addition, the interface 400 may include a new account selector 406 to enable the user 112 to create an account by providing a username, e-mail, etc., and a password or by using other known access techniques. The interface 400 may also include a return-to-merchant link 408 to enable the user to return to a previous website or page when the user is redirected to the interface 400, such as from the view-cart link 308.

In some embodiments, the interface 400 may be made available to the user inside of the merchant's electronic marketplace, but may be provided by the host 102. For example, the interface 400 may be viewable within a frame provided in a webpage on the merchant's electronic marketplace. In this way, the user 112 may continue to interact with the merchant while having ready access to the interface 400 to view the cart 104.

Figure 5:
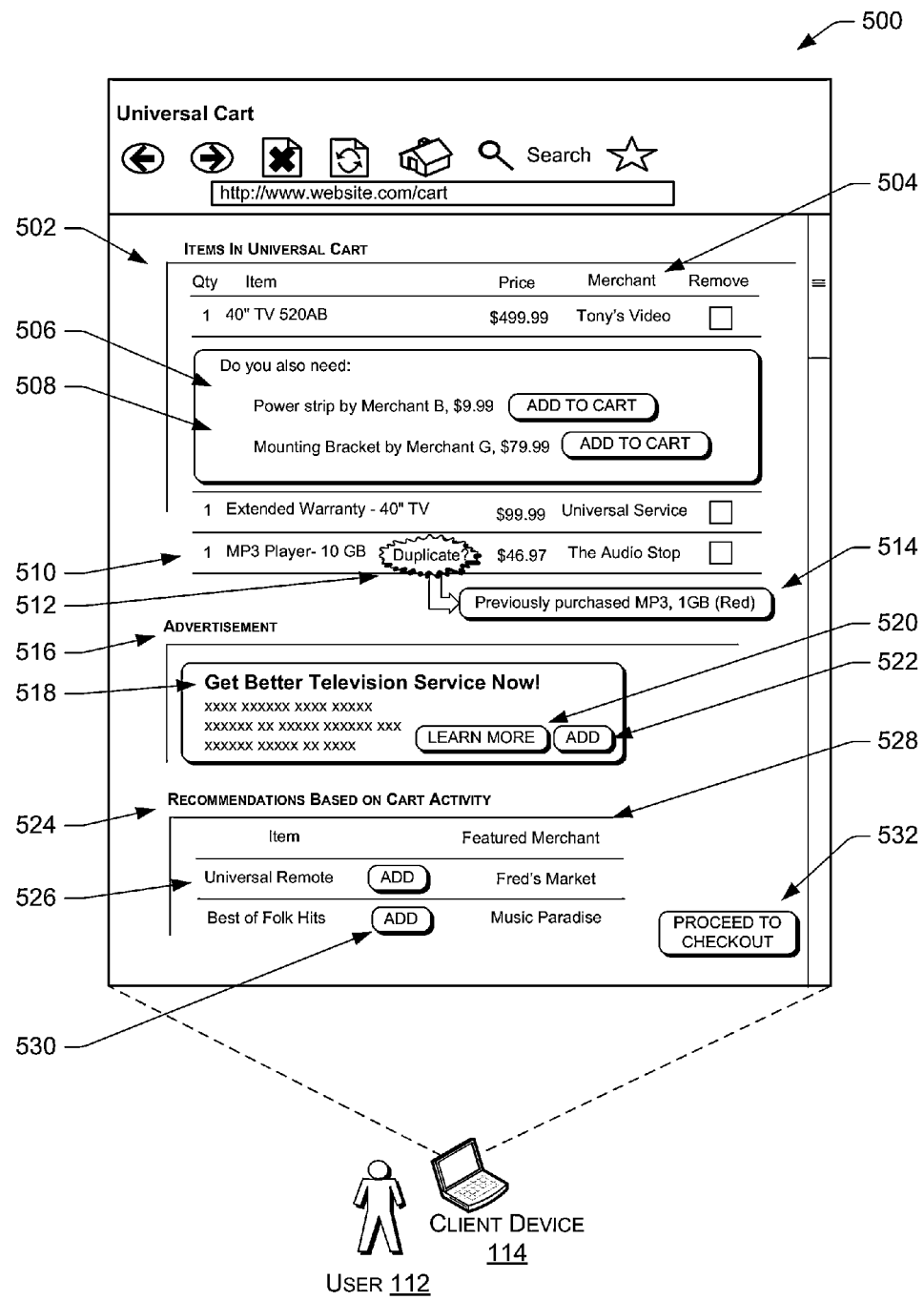
FIG. 5 is an illustrative interface of a universal shopping cart that includes complementary items, an advertisement based on cart transactional history, and recommended items based on cart transactional history.

FIG. 5 is an illustrative interface 500 of the cart 104 that includes complementary items, an advertisement based on cart transactional history, and recommended items based on cart transactional history. The interface 500 may be accessible by the user 112 following a successful sign in from the interface 400 or directly from the view-cart link 308 of FIG. 3 when the user is already signed into the cart or when no sign in is required.

The interface 500 may include an item-view section 502 to list the items in the cart 104. The items may be listed with relevant information that includes a merchant column 504 to list the merchant associated with each selected item. The item-view section 502 may include various functionality controls to enable the user 112 to remove items, update quantities, or perform other functions related to the status of the items.

In some embodiments, the item-view section 502 may include a complementary item sub-section 506 that includes complementary items 508 associated with a host item in the cart. The complementary items 508 may be used to "up-sell" to the user 112. For example, when the user's cart includes a television, the complementary items 508 may include a power strip, mounting brackets, cables, a service plan, an extended warranty, and so forth. The complementary items 508 may be selected from the same merchant that provides the selected (host) item. In some embodiments, the complementary items 508 may be from different merchants than the merchant that provides the selected item. In further embodiments, controls may be used to limit items from different merchants except when the merchant of the host item does not offer a particular complementary item for acquisition by the user 112.

In some embodiments, an item listed in the item-view section 502 may be similar (identical, substantially identical) to another item associated with the user 112 via the cart 104. These items may be termed "duplicate" for purposes of this disclosure. The duplicate item is any item that is the same or similar to another item associated with the user via the cart and based on various attributes. For example, if the user purchase an mp3 player (music playing device) in a first transaction facilitated by the cart 104 and then selects a second mp3 player at a later time for inclusion in the cart, the second mp3 player may be identified as a duplicate 510 and may include a duplicate designator 512.

An item may be designated as a duplicate in response to an item comparison measured against a similarity threshold. Thus, the duplicate detection 210 may be a comparison of all of the information stored regarding a selected item in comparison to other items to determine if the selected item and one or more of the other items have a similarity beyond the determined similarity threshold. For instance, the duplicate detection 210 may involve comparing attributes of a selected item versus attributes of previously acquired items. If the selected item shares a percentage of attributes with that another previously acquired item that is greater than a threshold percentage, then the item may be deemed a duplicate. For instance, if an item shares at least 90% of the same attributes with a previously acquired item, then the item may be deemed a duplicate. Of course, other implementations may use any other threshold, such as 75%, 85%, 95%, 99%, etc.

In some embodiments, a previous purchase (i.e., a similar item from the user's history) may be indicated as a duplicate via a message 514. The message 514 may include attributes of the previous purchase, such as a name, model number, color, technical specifications (e.g., memory capacity, processor speed, or other important technical specifications for a particular item). In some embodiments, one of the technical specifications may be deemed a primary function and used in the duplicate detection. Ultimately, the duplicate designator 512 and/or the message 514 may alert the user 112 to a previous purchase and provide relevant information about previous purchase.

In some embodiments, the interface 500 may include an advertisement section 516. The advertisement section 516 may present an advertisement 518 or other message to the user 112 based on items the user interacts with via the cart 104. For example, if the user's transaction history with the cart 104 includes a trend of purchasing a particular type of music, then the advertisement section 516 may include the advertisement 518 of new album of the particular type of music, an advertisement for a music subscription service, and so forth. The advertisement 518 may include a link 520 to a merchant offering the item of the advertisement and/or an add-to-cart link 522 to enable the user 112 to add the item to the cart 104 in the item-view section 502 for eventual acquisition.

The interface 500 may also include a recommendation section 524 to enable a display of recommendations 526 to the user 112. The recommendations 526 may be based on previous items selected by the user for inclusion in the cart 104. For example, the recommendations 526 may include items that other users purchased who have purchased items, or have items in their cart, that are similar or the same as items associated with the user 112 via the cart 104. In this way, the user may receive suggestions as to other items he or she may like based on the user's transaction history with the cart 104. The recommendations 526 may be provided from other merchants that interact with the cart 104, such as the merchants 106. The recommendation section 524 may list the recommendations 526 and include a featured merchant 528 that offers the recommendation 526 for acquisition by the user 112. The recommendation section 524 may also include add-to-cart buttons 530 to enable the user to add one or more of the recommendations 526 to the cart 104 to enable a later transaction and acquisition of the recommended item. The interface 500 may also include a proceed-to-checkout button 532 to enable navigation to another interface that may be used to process a payment for selected items in the cart 104.

The various features described in the interface 500 may be implemented separately (e.g., on different pages and/or sections of the UI 120 and/or the electronic marketplace 118), or in various combinations. The various features, (i.e., the complementary item sub-section 506, the item-view section 502, the duplicate designator 512, the advertisement section 516, and the recommendation section 524) may also be selectively implemented in other interfaces to provide an enhanced user experience by leveraging transactional data captured by user interaction with the cart 104.

Figure 6:
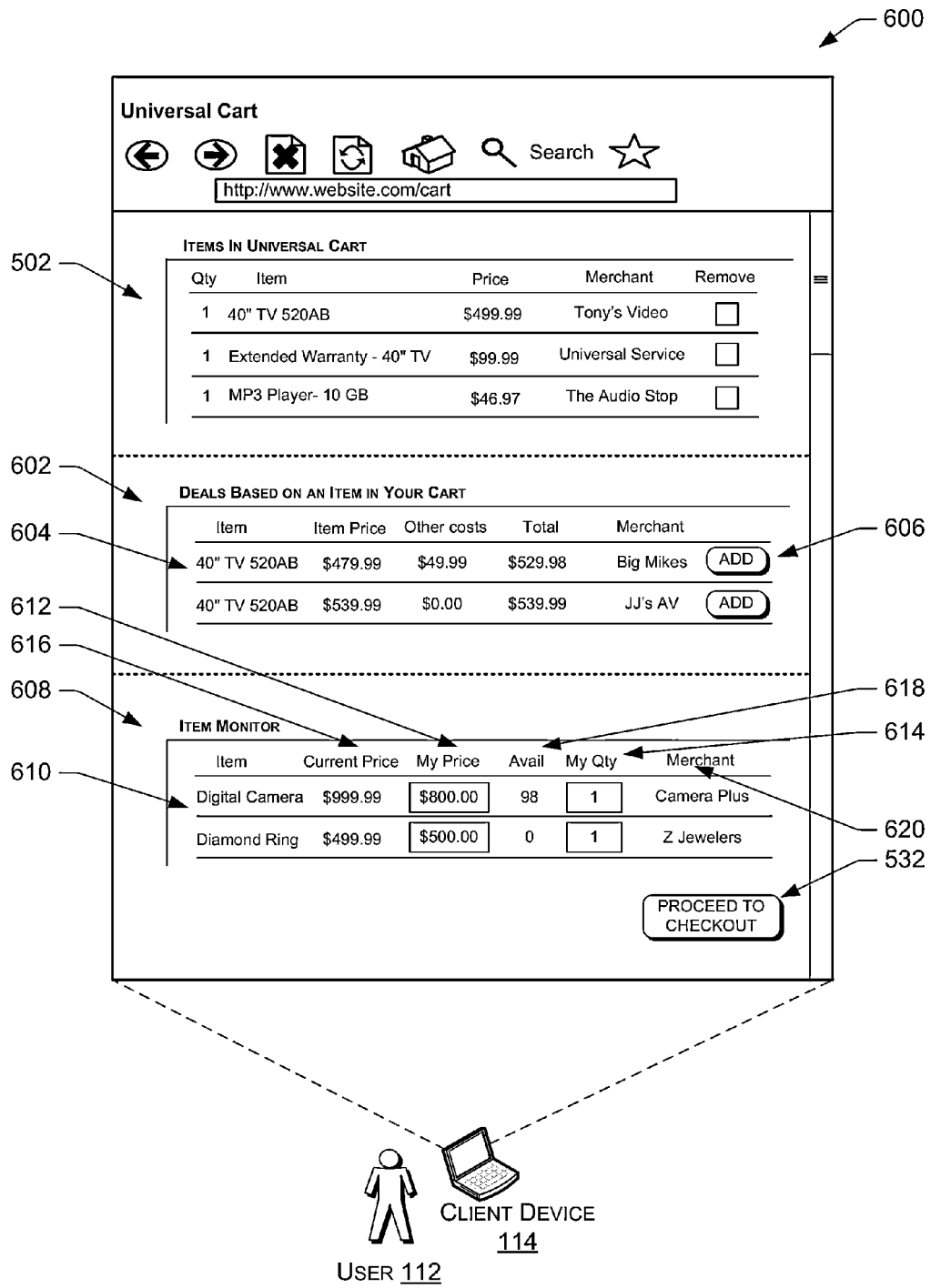
FIG. 6 is an illustrative interface of a universal shopping cart that includes offers or "deals" based on items in the cart. This interface also includes an item monitor portion that enables a user to direct the universal shopping cart to take specified actions based on an updated price or an updated available quantity of tracked items.

FIG. 6 is an illustrative interface 600 of the cart 104 that includes offers or "deals" based on items in the cart. This interface also includes an item monitor portion that enables a user to direct the universal shopping cart to take specified actions based on an updated price or an updated available quantity of tracked items. The interface 600 may include the item-view section 502 to list items that are currently in the user's cart.

In some embodiments, the interface 600 may include a deal-finder section 602 to enable the user 112 to comparison shop across at least a portion of the merchants 106 that offer similar items as an item listed in the item-view section 502 of the user's cart 104. Similar items may be complementary items (e.g., items used with other items), substitute items (e.g., commonly substituted by the users), and items frequently associated with other items (e.g., items often purchase together).

For example, the user 112 may include a television in the cart 104. The deal-finder section 602 may list comparison items 604 that are similar to or identical to a host item (e.g., the television) based on item attributes such as model number, technical specification, and so forth. In various embodiments, the comparison items 604 may be ranked based on price or other criteria, which may be used to select and sort the comparison items for presentation in the deal-finder section 602. For example, column headings may be selectable by the user 112 to enable a sort of the comparison items by a respective column criterion (e.g., sort by total cost, etc.). The user 112 may add (or substitute/swap) one of the comparison items 604 into the item-view section 502 using the add-to-cart button 606.

In accordance with various embodiments, the interface 600 may include an item monitor section 608. The item monitor section 608 may enable a user to add monitored items 610 that the user 112 desires to purchase when a threshold is reached. The user may insert a my-price value 612 and/or a my-quantity value 614 as a desired quantity. The item monitor section 608 may also list a current price 616 and/or available quantity 618. In some embodiments, the item monitor section 608 may display a merchant 620 associated with the monitored item 608 while in other embodiments the monitored items 610 may be monitored from multiple ones of the merchants 106.

In various embodiments, the item monitor section 608 may function to acquire the my-quantity value 614 of items when the available quantity 618 enables fulfillment of the number of desired items (i.e., available quantity≧my-quantity value 614). In addition or an alternative, the item monitor section 608 may function to acquire an item of the monitored items 610 when the current price 616 is equal to or less than the my-price value 612 designated by the user. The price and quantity may also be used in conjunction to prompt fulfillment of an item of the monitored items 610.

The various features described in the interface 600 may be implemented separately (e.g., on different pages and/or sections of the UI 120 and/or the electronic marketplace 118), or in various combinations. The various features of the interface 600 may also be selectively implemented in other interfaces to provide an enhanced user experience by leveraging transaction data captured by user interaction with the cart 104.

Illustrative System

Figure 7:
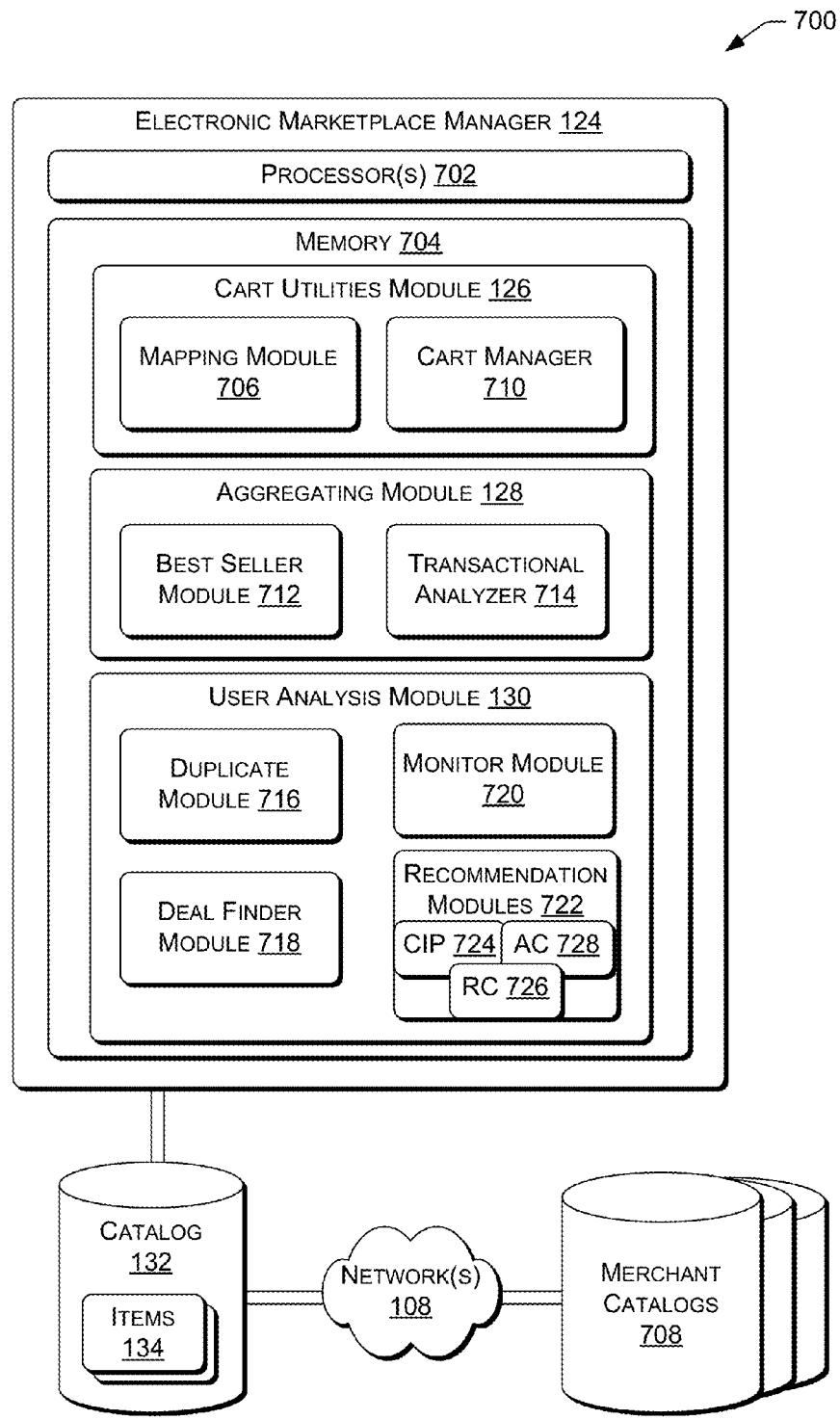
FIG. 7 is a block diagram of an illustrative system having modules of the electronic marketplace manager of FIG. 1.

FIG. 7 is a block diagram of an illustrative system 700 having modules of the electronic marketplace manager of FIG. 1. The system includes processor(s) 702 and memory 704 that includes various modules/components, having instructions, that when executed, cause the processors to perform various processes/acts as disclosed herein.

In some embodiments, the cart utilities module 126 may include a mapping module 706 to map the common items 134 to items in merchant catalogs 708 made available via the network 108. By employing the common catalog 132, each merchant may continue to use legacy catalogs and not have to update their respective catalog with naming conventions, organizations, etc. used by the common catalog or by other merchants.

The mapping module 706 may perform mapping as a pre-process when merchants make use of the cart 104. When new items are added to the cart 104, the host 102 may update the mapping via the mapping module 706 via a batch process or individual update. In some embodiments, the mapping module 706 may map the merchant items to the common items 134 based on a description of the merchant's items. In various embodiments, the mapping module 706 may perform the mapping on an ad hoc basis by mapping merchant items based on item information sent to the cart 104. The item information (e.g., model number, description, etc.) may enable mapping the merchant items to the common items 134.

In some instances, the item information may not include enough detail to enable the mapping. In these instances, the mapping module 706 may use the item information to query the respective merchant electronic marketplace to obtain further details to enable the mapping.

The cart utilities module 126 may also include a cart manager 710 to perform basic functionality of the cart. The cart manager 710 may be used to receive item information for items from merchants for inclusion in the cart 104 and ultimately transmit messaging to the merchant when items are transacted, acquired, or purchased from the cart. In addition, the cart manager 710 may execute general features of the cart 104 such as organizing the items in the items-view section 502, storing item data between visits to the cart, processing sign in information via the interface 400, and other tasks related to a general operation of the cart that allows the user 112 to select, view, and acquire items via the cart where the items originate from a merchant's electronic marketplace.

The aggregating module 128 may include a best seller module 712 and a transactional analyzer 714. The best seller module 712 may aggregate acquisitions and other related metrics from the users 112 via the cart 104. The best seller module 712 may then output a list, ranking, or other display of items based on item activity associated with the cart 104 (e.g., list of best sellers for a given time period, etc.). The output may be shown on an interface, such as the interface 300 in the best seller section 310. In some instances, the best seller module 712 may use data from the mapping module 706 to enable aggregation of items acquisitions originating from different ones of the merchant catalogs 708.

The transactional analyzer 714 may perform pre-processing of data from the cart, such as transactional data and user interaction with the items via the cart, to enable additional processes. For example, the transactional analyzer 714 may determine relationships between items to allow for recommendations across multiple users.

In accordance with various embodiments, the user analysis module 130 may include a duplicate module 716 to detect the duplicate 510 shown in FIG. 5. In some instances, the duplicate module 716 may use data from the mapping module 706 to enable linking items to identify the same or sufficiently similar (and, therefore, duplicate) items. The duplicate module 716 may extract item attributes from an identified duplicate item and present the item attributes for display to the user in association with an item having the duplicate. In this way, the user 112 may be informed about related prior purchases. In some embodiments, the duplicate module 716 may differentiate between consumable items and no-consumable items. Consumable items may be items that a user consumes (uses on a regular basis) such as food items, personal hygiene items, etc. In some instances, the duplicate module may only indicate that an item is a duplicate when the item is a non-consumable item.

A deal finder module 718 may be used to populate the deal-finder section 602 with the comparison items 604 of the interface 600. In some embodiments, the deal finder module 718 may crawl various merchant catalogs 708 to link items and rank the items based on price or other attributes. The deal finder module 718 may then provide the comparison items 604 based on an item in a user's cart. In some embodiments, the deal finder module 718 may limit the comparison items 604 to items offered by designated merchants, such as merchants designated by the merchant that offers to item (i.e., host item) in the cart 104.

A monitor module 720 may be used to enable the item monitor section 608. Using the monitor module 720, the user 112 may establish a threshold for an item. The monitor module 720 may include thresholds for a desired price (i.e., the my-price value 612) and/or for a desired quantity (i.e., the my-quantity value 614), which may be compared to the current price 616 and the available quantity 618, respectively. In some embodiments, the monitor module 720 may monitor items for a respective merchant. However, the monitor module 720 may also monitor all the merchant catalogs 708 to identify when an item in one of the catalogs meets respective criteria. In various embodiments, the monitor module 720 may initiate acquisition of the item, upon meeting established criteria, on behalf of the user.

Recommendation modules 722 may include various related components that include a complementary item component (CIP) 724, a recommendation component (RC) 726, and an advertisement component (AC) 728. The recommendation module 722 may use data from the mapping module 706 to provide various recommended data.

The complementary item component 724 may populate the complementary item sub-section 506 with the complementary items 508. The complementary items 508 may be based on the host item listed in the item-view section 502 of the cart 104. In some embodiments, the complementary item component 724 may limit the complementary items 508 to those offered by a same merchant as the host item or to merchants approved by the merchant that offers the host item. In various embodiments, complementary items may be listed in the complementary item sub-section 506 even when the items are not offered by the merchant of the host item or the approved merchants.

The recommendation component 726 may populate the recommendation section 524 with the recommendations 526. The recommendations may be based in part on data from the transactional analyzer 714 that creates relationships been users based on user activity with the cart 104 with the merchants 106. For example, the recommendation component 726 may enable providing a list of items that other users purchased that also purchased a similar item that the user 112 currently has in the cart 104, such as in the item-view section 502 of the cart. Other relationships may be defined and used to recommend items to the user 112.

An advertisement component 728 may be used to populate an advertisement section 516 with one or more advertisement 518. The advertisement component 728 may receive advertisements from the merchants 106, which may be selected by the advertisement component 728 for display to the user 112 based on items in the cart 104. For example, when the user 112 has a television in the cart 104, the advertisement component 728 may select an advertisement for display that relates to the television (e.g., a service contract advertisement, etc.). In some embodiments, the advertising component 728 may track hits, conversions, and other metrics related to the advertisements and enable distribution of advertising revenues to the merchants 106 or others based on items that initiate the advertisement. The advertising component 728 may also include various controls determined by merchants to prevent direct cross-merchant competition via content of the advertisements (e.g., advertise something for sale by merchant B when Merchant A offers the initiating produce and also offers the item in the advertisement).

Illustrative Operation

FIGS. 8-16 are flow diagrams of illustrative processes of the electronic marketplace manager 124 and associated modules. The processes are illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 8:
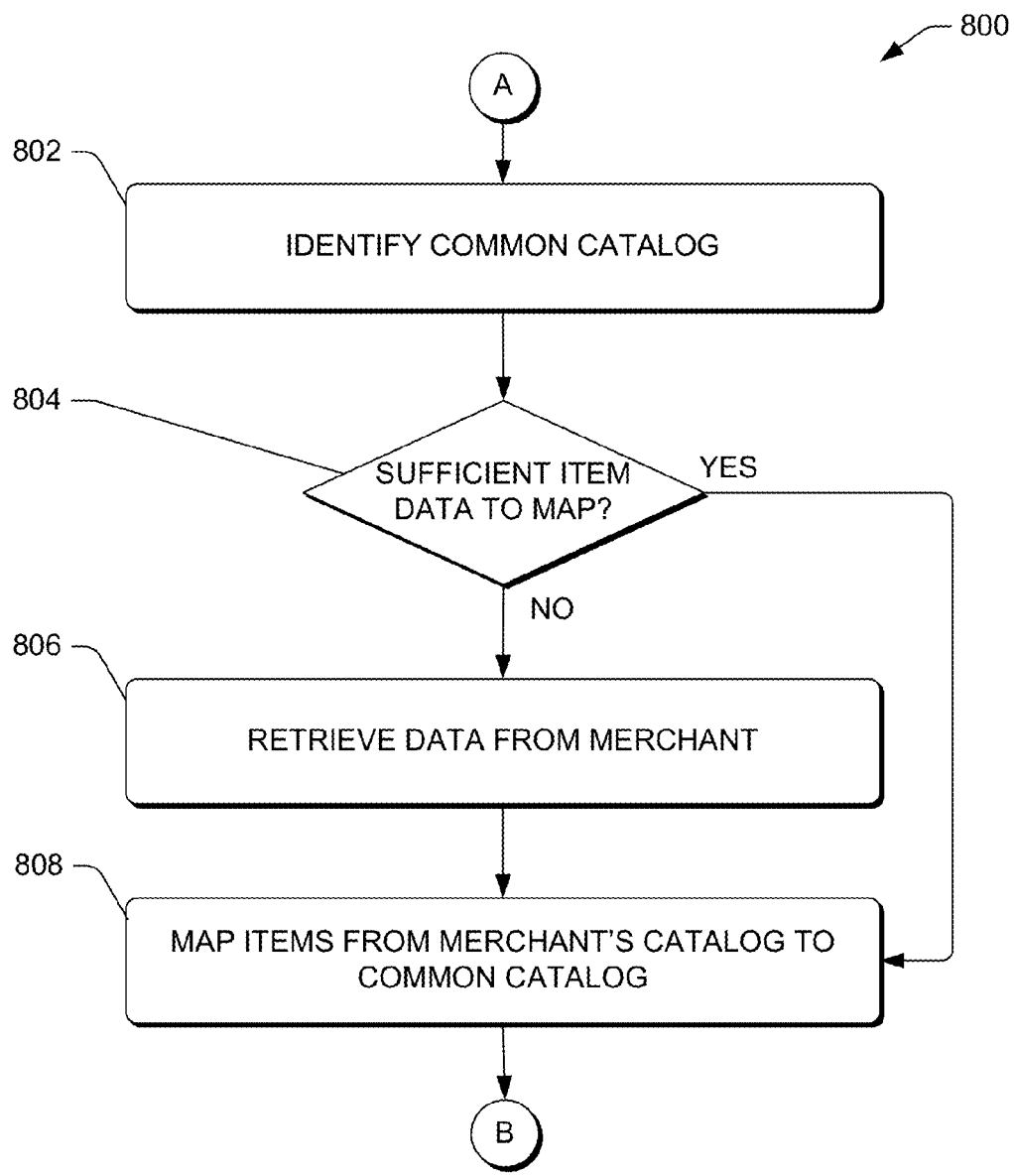
FIG. 8 is a flow diagram of an illustrative process of mapping a merchant-specific catalog to a common catalog to facilitate cross-marketplace item comparisons.

FIG. 8 is a flow diagram of an illustrative process 800 of mapping a merchant-specific catalog to a common catalog to facilitate cross-marketplace item comparisons. The process 800 may be performed at least in part by the mapping module 706.

At 802, the mapping module 706 may identify a common catalog (e.g., the common catalog 132) for mapping items of other catalogs to, such as the items of merchant catalogs 708. In some embodiments, the common catalog 132 may be an independent catalog that is a compilation of unique instances of items in the merchant catalogs 708. In various embodiments, the common catalog may be one of the merchant catalogs 708 that is designated as the common catalog and used to link items from disparate implementations of the other catalogs of the merchant catalogs.

At 804, the mapping module 706 may determine whether sufficient element data is available to map item(s) to the common catalog from the merchant catalog 708. When the mapping module 706 does not obtain adequate information about an item to be mapped, such as from the cart manager 710, the mapping module may have to collect additional information at an operation 806. However, when the cart manager 710 has adequate detail about an item (e.g., model number, item description, etc.), then sufficient data may exist and the mapping module 706 may advance to an operation at 806.

At 806, the mapping module 706 may query the merchant to obtain adequate information to enable mapping an item to the common items 134 of the common catalog 132. Items may be mapped to the common items 134 by linking model numbers, descriptions, technical specification, or other attributes of items to identify a corresponding item in the common catalog 132 for each item in the merchant catalogs 708.

At 808, the items may be mapped from the merchant catalog 708 to the common items 134 in the common catalog 132. The mapping may enable comparison of items across multiple of the merchant catalogs 708 that may list and categorize items using different schemes that are not compatible without use of the common catalog 132 as an intermediary tool for linking the items of the merchant catalogs 708.

Deal Finder

Figure 9:
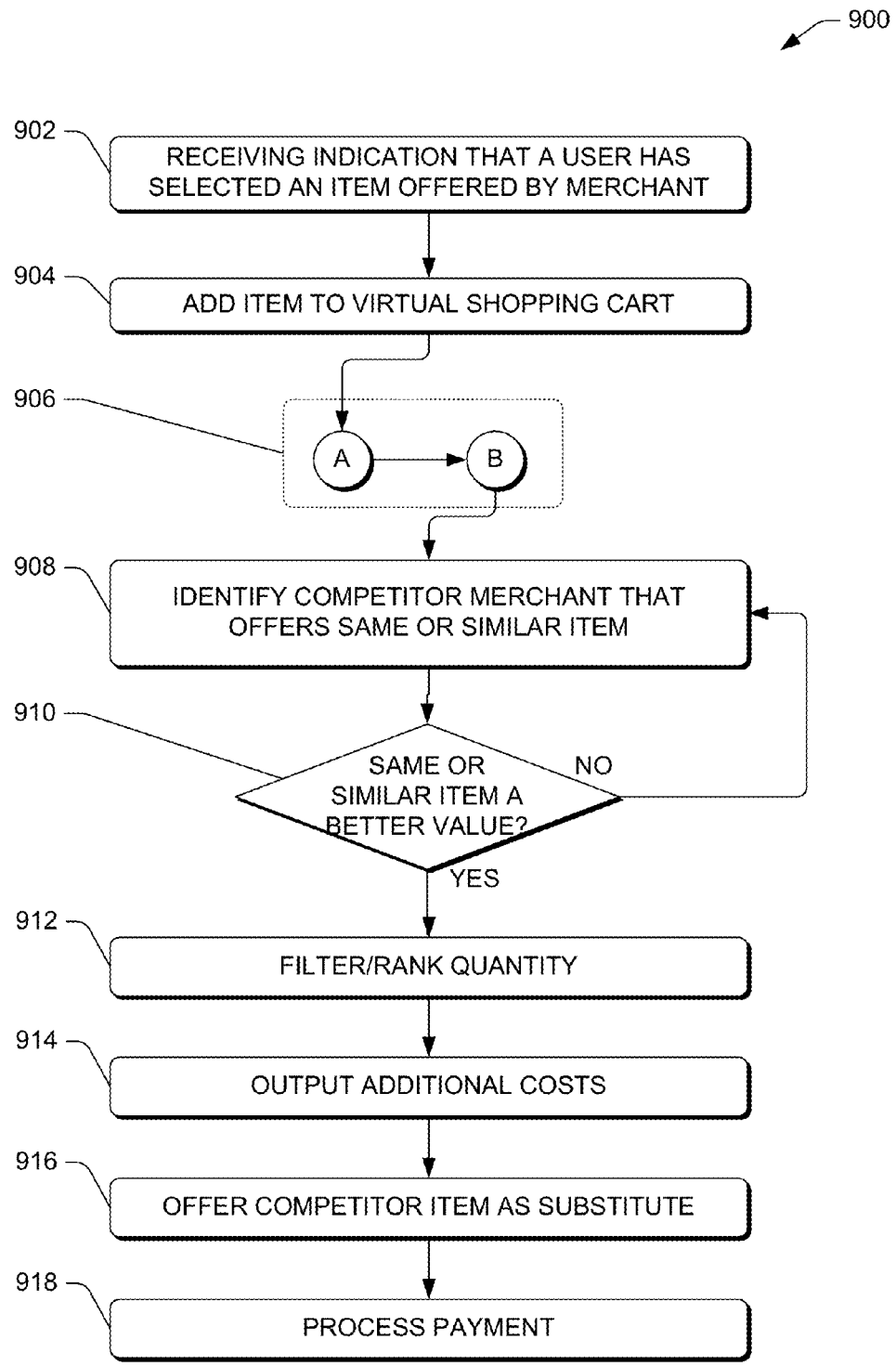
FIG. 9 is a flow diagram of an illustrative process of identifying alternative elements offered at a better value than an item in a cart.

FIG. 9 is a flow diagram of an illustrative process 900 of identifying alternative elements offered at a better value than an item in the cart 104. In accordance with various embodiments, the cart utilities module 126 and the deal finder module 718 may perform some or all of the operations of the process 900. As used herein, the deal finder module 718 may determine a "better value" when an item is offered at a lower price than a same or a similar item. In addition, a better value may include an item bundle (e.g., game console with bundled games, etc.) that, when bundled items are compared on an individual basis, is offered at a lower price than a similar item or similar item bundle.

At 902, the cart utilities module 126 may receive an indication that the user has selected an item offered by a merchant for a price. For example, the user 112 may select an item from an electronic marketplace of the first merchant 106(1). At 904, the cart utilities module 126 may add the item selection to the cart 104. For example, the item selection may be added to the cart 104 in the item-view section 502 of the interface 500.

At 906, the mapping module 706 may map the item to the common catalog 132 via the process 800.

At 908, the deal finder module 718 may identify one or more competitor merchants that also offer the element. For example, the deal finder module 718 may crawl electronic marketplaces (e.g., the electronic marketplace 110, etc.) of the merchants 106 to identify similar (identical or substantially similar) items. Substantially similar may be defined by a percentage of shared attributes between items that is greater than a threshold percentage (e.g., 80%, 90%, 95%, 99%, etc.).

At 910, the deal finder module 718 may determine whether the same or similar item from the competitor merchant is offered at a better value than the item selected at the operation 902. In some embodiments, the deal finder module 718 may analyze a price of an item to determine whether a better value exists. A better value may be determined when the price of the similar item is less than or equal to the price of the selected item in the cart 104. When the price is greater than the price of the selected item in the cart, then the item may be discarded and another item may be identified at 908. In some embodiments, the price used to determine whether a better value exists may include a total cost of the similar items and thus compare additional costs of the item such as processing costs, taxes, extended warranty costs, etc.

In accordance with one or more embodiments, the deal finder module 718 may also determine whether an item is a better value based on bundle contents. For example, the item selected at the operation 902 may be video game console that includes one additional game and is listed for $199.99. A similar item may be a bundle package that includes the same video game console and two additional games and is offered for sale at $209.99, where the second additional game retails for $49.99. The deal finder may determine that the similar item (i.e., the latter bundle package offered for $209.99) is a better value and proceed via the "yes" route from the decision block at 910. In some embodiments, the deal finder module 718 may determine whether a better value exists by individually summing costs of each item in the bundles. In various embodiments, the deal finder module 718 may determine whether a better value exists by adding individual prices of any items that are omitted from a first bundle and that are included in a second bundle, thus enabling a direct comparison of contents.

The process 900 may continue to identify additional items (batch process) or individually identify an item and then proceed with the operation 912. For illustrative purposes, a batch process is described with respect to the process 900, thus multiple items may be identified that have a sale price that is less than or equal to the price of the selected item in the user's cart.

At 912, the deal finder module 718 may filter a quantity of the items identified at the operation 908. The items may be ranked based on similarity (identical/substantially identical) and/or by price. In some embodiments, a maximum number of items may be selected for presentation to the user in the cart 104 in association with the selected item from the operation 902. In this way, the deal finder module 718 may enable the host 102 to perform a reverse auction and only display a limited number of the items (via offers) that are deemed best.

At 914, the deal finder module 718 may present additional costs associated with the items offered by competitor merchants. In this way, the user may select an item that has lowest total cost while considering additional costs such as shipping, handling, and tax, among other possible additional costs. As discussed above with reference to the decision operation 910, the additional costs may be analyzed at 910 to determine whether the similar item is a better value.

At 916, the deal finder module 718 may offer the item as substitute to the selected item. For example, the item may be presented to the user 112 in the deal finder section 602 of the interface 600 shown in FIG. 6.

At 918, the cart utilities module 126 may process payment for selected items in the cart 104 and a respective merchant of purchased items to initiate fulfillment of the item and/or other related tasks.

In accordance with various embodiments, the host 102, via the deal finder module 718 may enable the merchants 106 to have an option to provide a better or different price of an item in order to compete with the other merchants and thus offer the best deal.

In some embodiments, the deal finder module 718 module may identify a single item at the operation 908 that may perform functions of multiple items in the cart 104. For example, the user 112 may have selected a MP3 music player and a mobile telephone to add to the cart 104. The deal finder module 718 may identify an item that has the functionality of both the MP3 music player and the mobile telephone and thus offer the item as a substitute at the operation 916 for both the MP3 music player and the mobile telephone in the user's cart.

Duplicate Item

Figure 10:
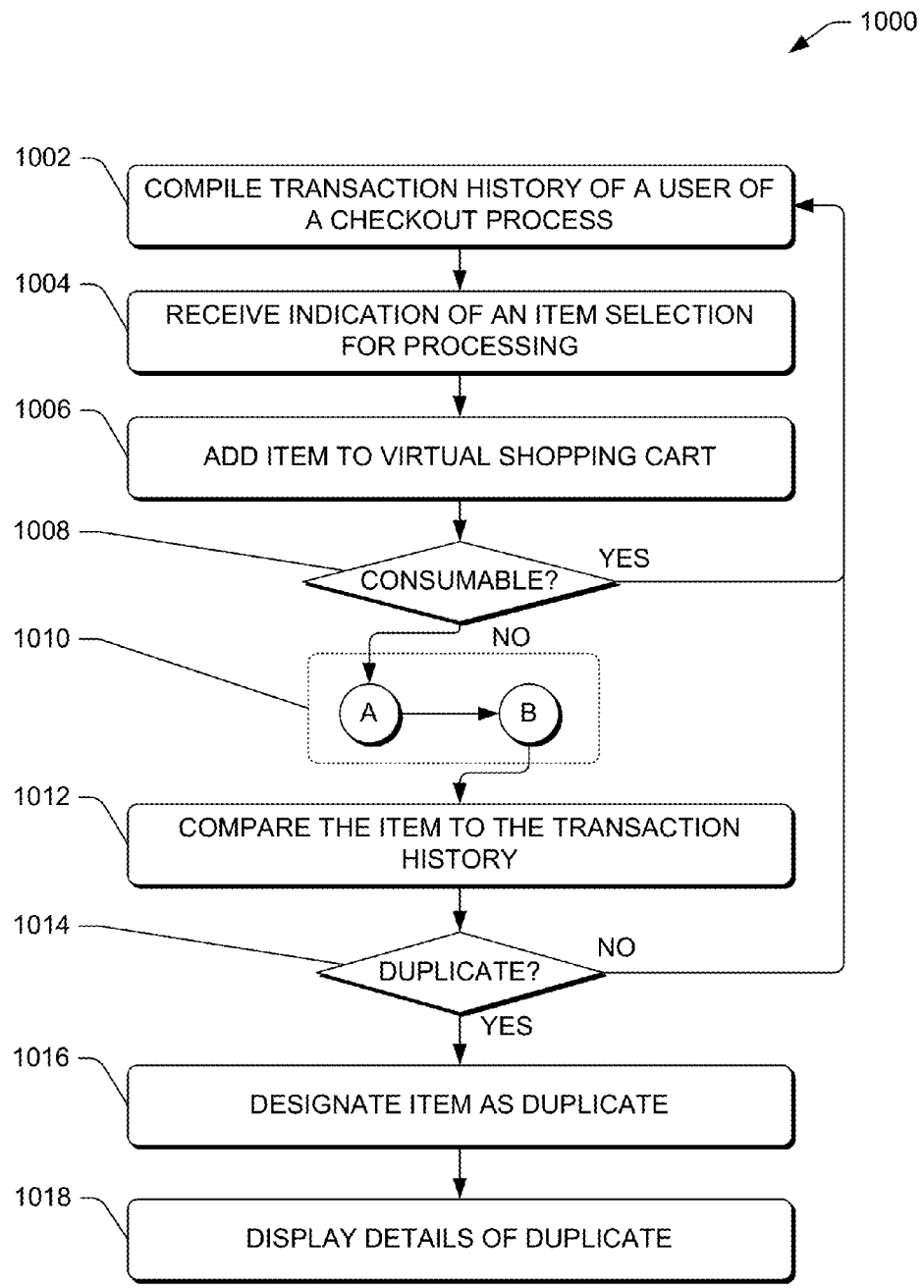
FIG. 10 is a flow diagram of an illustrative process of designating an item as a duplicate item after detecting that the item is the same or sufficiently similar to an item previously purchased by a user.

FIG. 10 is a flow diagram of an illustrative process 1000 of detecting a duplicate item as similar to a previously purchased item by the user 112 via the cart 104. In accordance with various embodiments, the cart utilities module 126 and the duplicate module 716 may perform some or all of the operations of the process 1000.

At 1002, the cart utilities module 126 may compile a transaction history of items that a user has previously acquired from multiple merchants via multiple electronic marketplaces and with use of the universal virtual shopping cart.

At 1004, the cart utilities module 126 may receive an indication that the user 112 has selected an item offered by a merchant such as the first merchant 106(1) for inclusion in the cart 104.

At 1006, the cart utilities module 126 may add the item offered by the merchant to the cart 104 associated with the user at least partly in response to the receiving of the indication.

At 1008, the duplicate module 716 may determine whether the item is consumable. A consumable item is an item that is typically purchased or acquired on a regular or continual basis. Consumable items may include groceries (e.g., food, drinks, etc.), personal care products (e.g., soap, etc.) and so forth. When the item is a consumable, the process 1000 may continue at the operation 1002. When the item is not a consumable (follow route "no"), then the process 1000 may continue at 1010.

At 1010, the mapping module 706 may map the item to the common catalog via the process 800.

At 1012, the duplicate module 716 may compare the item to the transaction history of items of the user 112 associated with the cart 104. The transaction history of items may include items that were acquired from various merchants via the electronic marketplace 110 of respective merchants. The comparison may be based on features of the item (e.g., ability to play MP3 audio files, etc.), the model number, the category, and so forth.

In some embodiments, the transaction history may be expanded to include transaction histories of users related to the user 112, such as children, a spouse, parents, and so forth. The user 112 may designate another user (designated user) to link various transaction histories via separate accounts. In some embodiments, the accounts may be linked via account settings that may enable sharing transaction history with designated users (via networking sites, shared addresses, or other criteria). In some embodiments, a designated user may provide a permission to combine transactional data with a requesting user.

At 1014, the duplicate module 716 may determine whether the item is a duplicate of an item in the transaction history. An item may be deemed a duplicate when the item is the same item or an item that is sufficiently similar based on comparing the details of the items (e.g., the technical specifications) or is used as a substitute for the item by other users. In some instances, a comparison may be performed in advance and/or by human inspection. When the item is not a duplicate, the process may continue at the operation 1002, otherwise the duplicate module 716 may advance to an operation 1016.

At 1016, the duplicate module 716 may designate the item as a duplicate when the item added to the cart 104 is identical or substantially identical to an item in the transaction history. In some embodiments, the duplicate may include the duplicate designator 512 to indicate to the user that the item is a duplicate as shown in FIG. 5.

At 1018, the duplicate module 716 may display details of the item in the transaction history that prompts the designation of the duplicate. For example, the item in the transactional history may be presented with the message 514 as shown in FIG. 5 that includes attributes of the previous purchase, such as a name, model number, color, technical specifications (e.g., memory capacity, processor speed, or other important technical specifications for a particular item). In some embodiments, the duplicate module 716 may inform the user, via a message, that an item in the user's transaction history includes functionality of an item in the user's cart (i.e., the duplicate item). For example, duplicate module 716 may generate a message that informs the user 112 that their mobile telephone plays MP3 audio files when the user adds an MP3 audio player into the cart 104. Or, the duplicate module 716 may inform the user 112 that the user or a spouse of the user has already previously purchased the exact same MP3 audio player.

Best Seller

Figure 11:
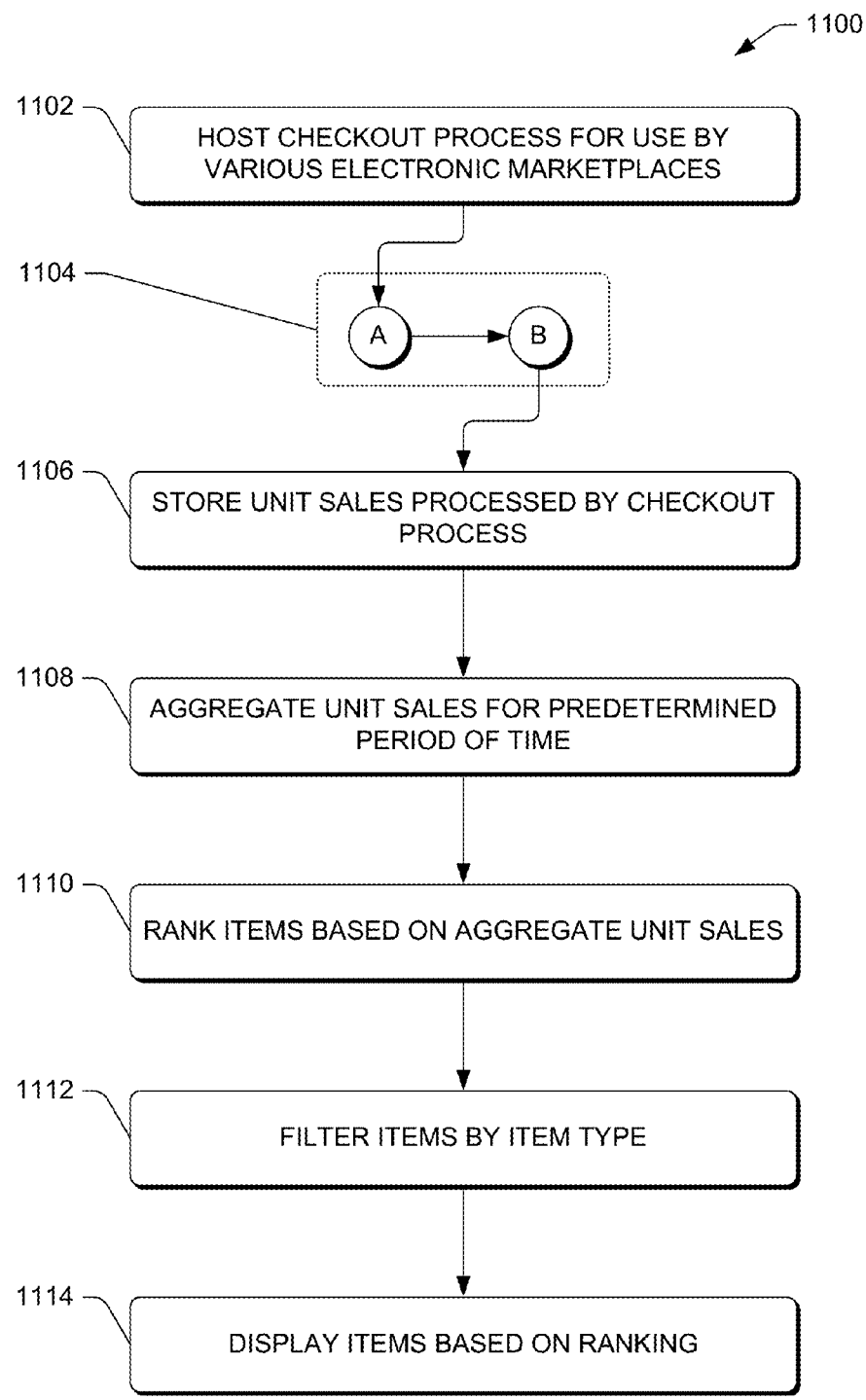
FIG. 11 is a flow diagram of an illustrative process of aggregating item acquisitions via the cart to identify and rank best selling items.

FIG. 11 is a flow diagram of an illustrative process of aggregating item acquisitions via the cart 104 to identify and rank best selling items. In accordance with various embodiments, the cart utilities module 126 and the best seller 712 may perform some or all of the operations of the process 1100.

At 1102, the cart utilities module 126 may host a checkout process that enables users to acquire items that are offered by various merchants at respective electronic market locations. The host 102 of the checkout process may receive information regarding an item from a merchant that offers the item. The host 102 may then notify the merchant when the item is purchased via the checkout process to initiate fulfillment of the element by the merchant.

At 1104, the mapping module 706 may map the items to the common catalog 132 via the process 800. The common catalog 132 may be used to group items during an aggregation of item acquisitions, purchase, and so forth. In some embodiments, the common catalog 132 may include a hierarchical structure to classify items, where unique items may be grouped into a general item classifier that describes substantially similar items. For example, substantially similar items may be the same item sold in different colors, as bundled packages, etc.

At 1106, the cart utilities module 126 may store an indication that an item has been acquired from one of the various merchants each time a transaction is processed by the checkout process via the cart 104.

At 1108, the aggregating module 128 may aggregate the indications for a predetermined period of time to determine a total number of times that each of the items has been acquired. The predetermined period may be selected as any amount of time such as, without limitation, a day, a week, a month, and a year. In some embodiments, the aggregation module 128 may aggregate the indications by merchant, which may enable reporting of a ranked list of merchants for particular items or grouping of items. For example, a report may be generated that lists a bestselling item and a ranked list of merchants that offer the item based on unit sales from each merchant (e.g., highest volume merchant is listed first, etc.).

At 1110, the best seller module 712 may rank the items based at least in part on the determined total number of times that each of the items has been acquired. The ranking may enable display or presentation of a top number of the items, such as the top five, top ten, top number for a category (e.g., electronics, etc.), top percentage, and so forth.

At 1112, the best seller module 712 may optionally filter items by item type. The item type may be a genre and/or category of the items (e.g., electronics, etc), a department, class, subclass grouping, or other defined types of items. The filtering may enable presentation of a specialized best seller list of a type of items, such as best selling televisions, best selling items in the video department, and so forth.

At 1114, the best seller module 712 may cause a display of a portion of the items based at least in part on the ranking. The items may be displayed based at least in part on the ranking. In some embodiments, the items may be displayed at an electronic market location hosted by one of the various merchants 106.

In various embodiments, the items may be displayed with an associated total number of times that the item has been acquired and a link to a merchant offering the element. In some embodiments, a ranked list of merchants may be associated with each item. This may enable the user 112 to select an item and then view a ranked list of merchants that offer the item. The list of merchants may include a seller rating (e.g., star rating, quality rating, etc.), which may influence the ranking of the merchant along with other factors such as aggregate unit acquisitions from the merchant, user recommendations, and so forth.

In accordance with various embodiments, the best seller module 712 may display other information or items along with each item in a best seller list. As an example, the best seller module 712 may display complementary items in association with an item in the best seller list.

Item Monitoring

Figure 12:
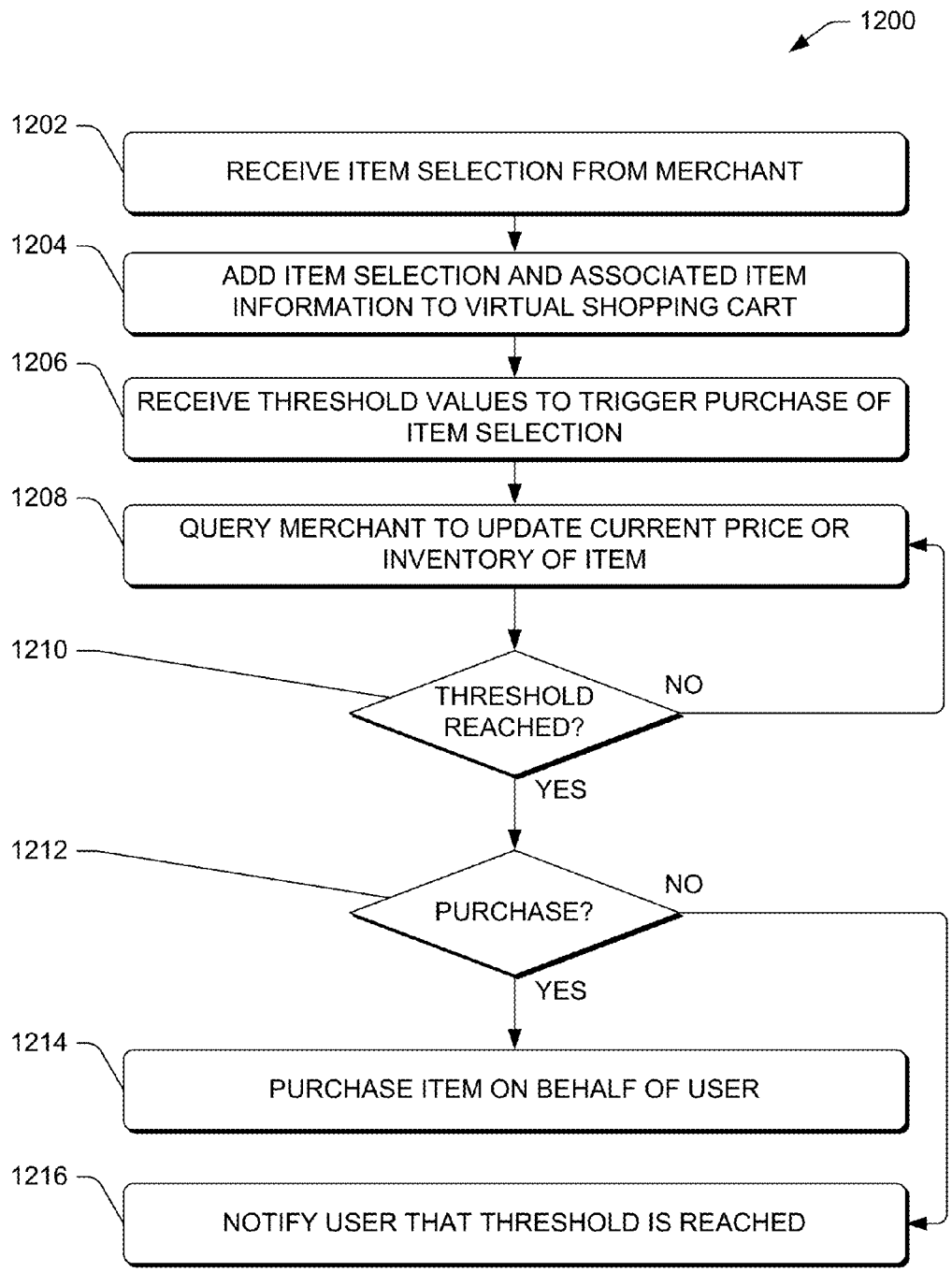
FIG. 12 is a flow diagram of an illustrative process of monitoring an item in a cart to update a current price and/or availability of the item.

FIG. 12 is a flow diagram of an illustrative process of monitoring an item in the cart 104 to update a current price and/or an availability of the item. In accordance with various embodiments, the cart utilities module 126 and the monitor module 720 may perform some or all of the operations of the process 1200.

At 1202, the cart utilities module 126 may receive an indication that the user 112 has selected an item offered for purchase by one of the merchant 106.

At 1204, the cart utilities module 126 may add the selected item to the cart 104 associated with the user at least partly in response to the receiving of the indication. In some embodiments, the item made available for purchase by the user 112 from the cart.

At 1206, the monitor module 720 may receive threshold values to trigger purchase of the selected item. In various embodiments, the monitor module 720 may associate the selected item in the virtual shopping cart with a desired quantity or a desired price, which may be selected by a user.

At 1208, the monitor module 720 may query the merchant or another merchant to determine an available quantity of the item and/or a current price of the item at the merchant or another merchant. The monitor module 720 may perform the queries periodically or randomly to update the current price and or available quantity.

At 1210, the monitor module 720 may determine whether a threshold as determined at the operation 1208 has been reached. When the threshold is not reached, the process 1200 may return to the operation 1208 to query the merchant. When the threshold is reached, the process 1200 may proceed to a decision operation at 1212. In various embodiments, the threshold may be reached when an available quantity reaches a desired quantity of the item, a current price reaches a desired price, or both of these thresholds are satisfied.

At 1212, the monitor module 720 may determine whether to purchase the item. In some embodiments, the monitor module 720 may initiate purchase of the item on behalf of the user 112 when the available quantity of the item equals or exceeds the desired quantity and/or when the current price of the item is less than or equal to the desired price. The item may be purchased on behalf of the user at 1214.

At 1216, the monitor module 720 may notify the user 112 that the threshold has been reached. When no purchase is desired at 1212, the notification may occur subsequent to the purchase decision. In various embodiments, the user 112 may be notified at the operation 1216 via a message in the cart 104, an email, simple message system (SMS) text message, a telephone call, or another communication to inform the user of the cart activity.

In accordance with various embodiments, the monitor module 720 may notify the customer when an item in the user's cart 104 has a price reduction that surpasses a threshold. The threshold may be determined by the merchants 106 and/or the host 102. For example, an item in the user's cart may have a price reduction that lowers the item's price by ten percent (10%). When the price drops below 10%, which may be the threshold, the user may be notified of the price reduction even though the user may not have designated the item to be monitored by the monitor module 720.

In further embodiments, the monitor module 720 may monitor items saved in the cart for later, or items that have been in the cart but not purchased, which may include items previously deleted from the cart. For example, the user 112 may select a camera and place it in the cart 104. Later, the user may delete the camera from the cart without purchasing it. At a later time, the price of the camera, as determined by the monitor module 720, may drop below a threshold value (e.g., 5% lower price, etc.). The monitor module 720 may then notify the user of the reduction in price of the camera via the cart, an email, SMS text message, and so forth.

Recommendations

Figure 13:
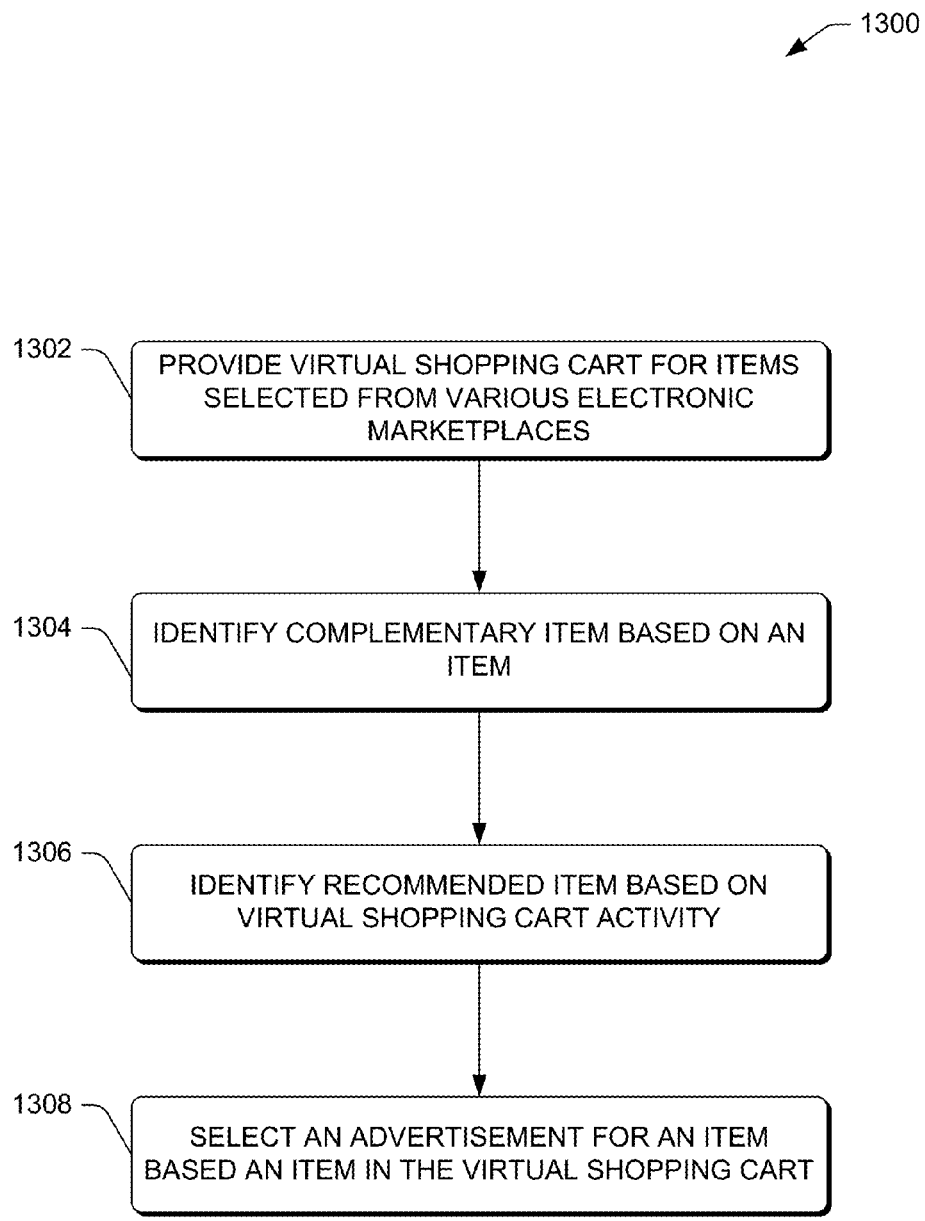
FIG. 13 is a flow diagram of an illustrative process of providing a cart for use by multiple disparate electronic marketplaces and providing enhanced user functions based on data collected from transactions involving the cart.

FIG. 13 is a flow diagram of an illustrative process 1300 of providing the cart 104 for use by multiple disparate electronic marketplaces and providing an enhanced user experience by way of recommendations based on data collected from transactions involving the cart. In accordance with various embodiments, the cart utilities module 126 and the recommendation module 722 may perform some or all of the operations of the process 1300.

At 1302, the cart utilities module 126 may provide the cart 104 to enable the user 112 to select and process items from various electronic marketplaces each have respective merchants.

At 1304, the recommendation module 722 may identify the complementary items 508 based on an item selected by the user from the various electronic marketplaces. The complementary items 508 may be used to "up-sell" to the user 112. The complementary items 508 may be provided by a same merchant that offers an item that initiates the complementary item (i.e., a host item). In various embodiments, the user 112 may add the complementary item to the cart 104 without returning to the electronic marketplace of the respective merchant.

At 1306, the recommendation module 722 may identify the recommendations 526 based on user activity of the cart 104. For example, the recommendation module 722 may analyze the user's transaction history in comparison with other user's transaction history involving the various electronic marketplaces, which in turn may enable recommendation of items to users.

At 1308, the recommendation module 722 may select advertisement 518 for an item based an item associated with the cart 104. For example, the advertisement 518 may be provided based on an item the user has in the cart or an item the user purchased that was in the cart at a prior time.

Figure 14:
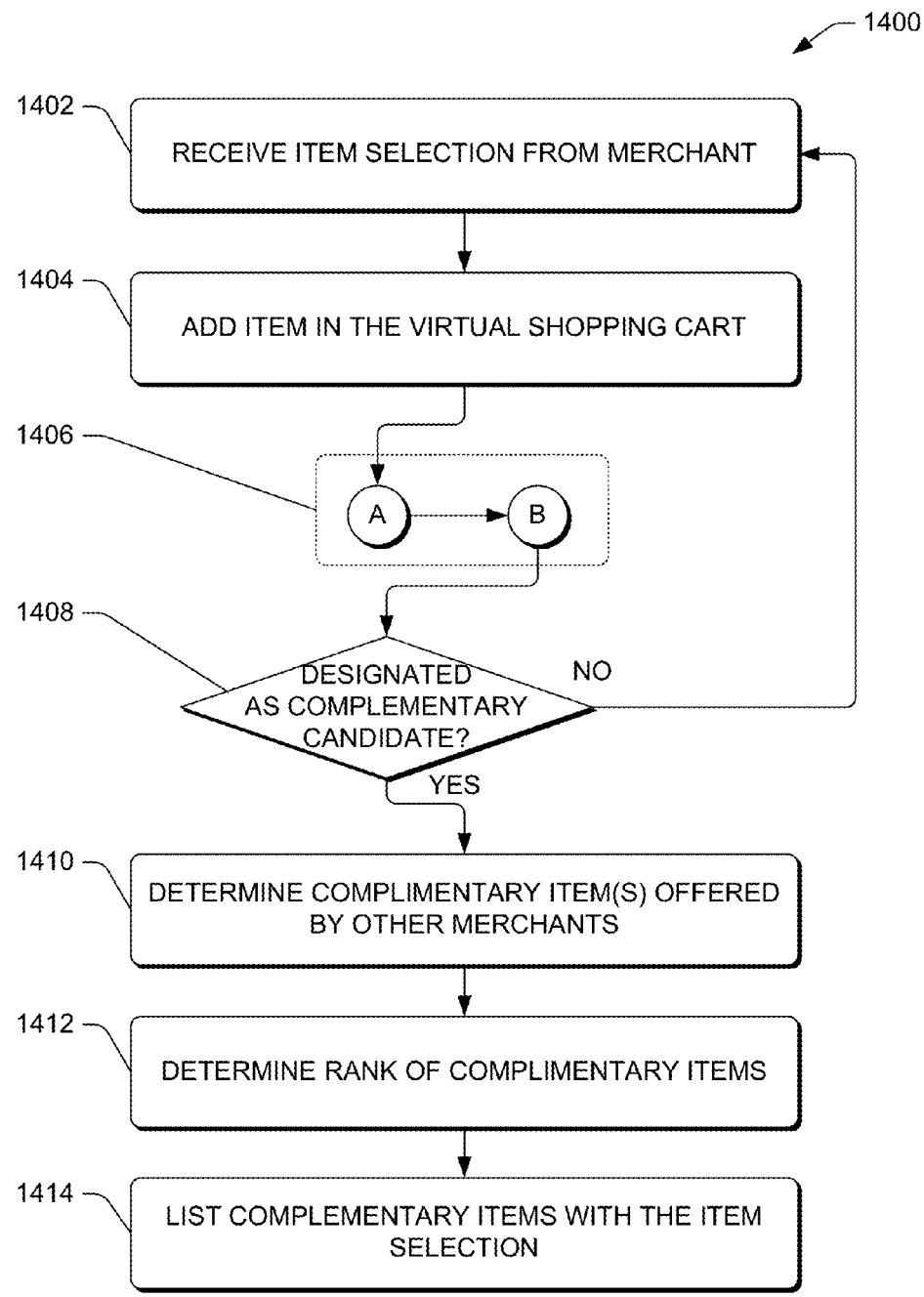
FIG. 14 is a flow diagram of an illustrative process of recommending complementary items to a user based on an item in the cart.
Figure 15:
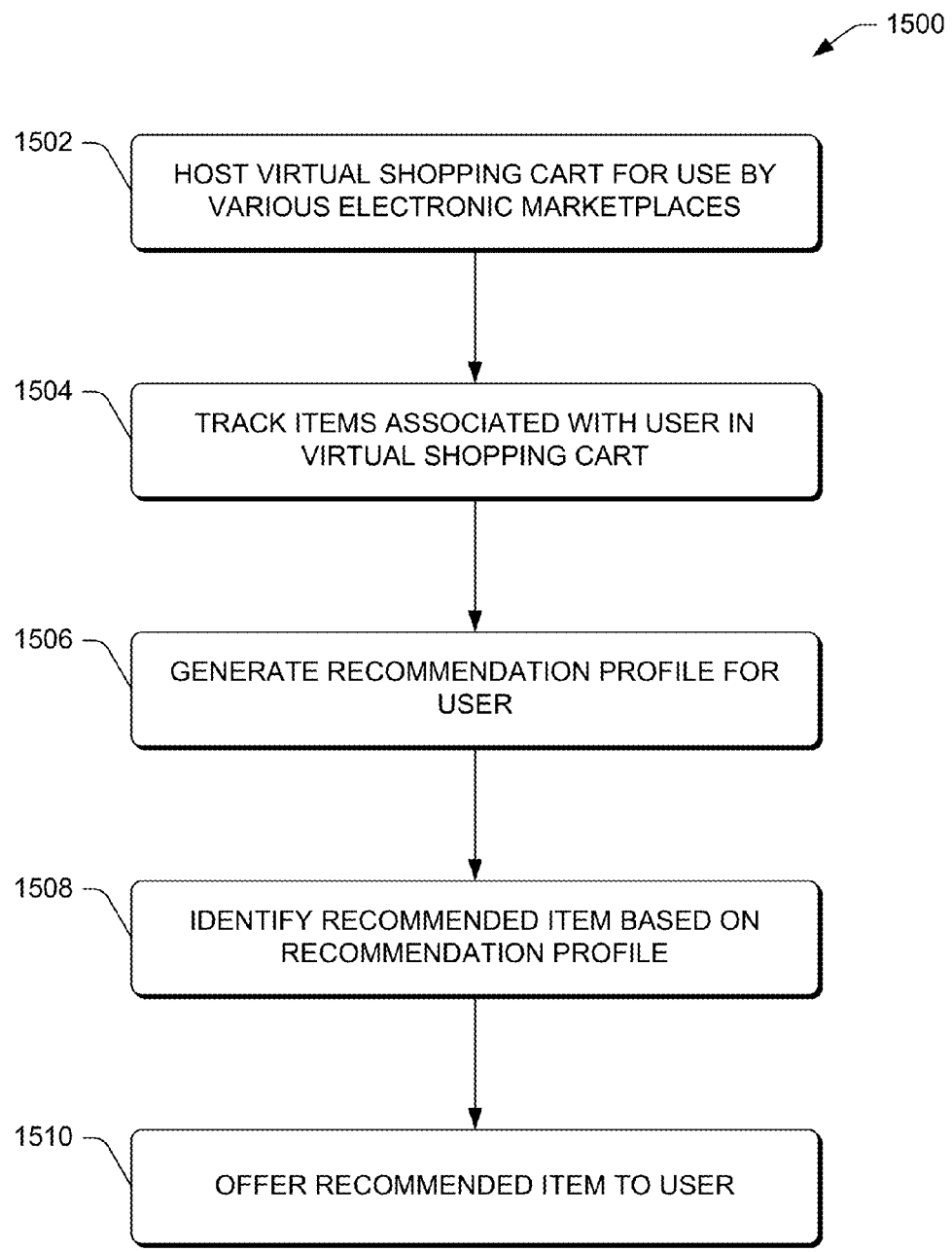
FIG. 15 is a flow diagram of an illustrative process of recommending items based on a transaction history of the user.
Figure 16:
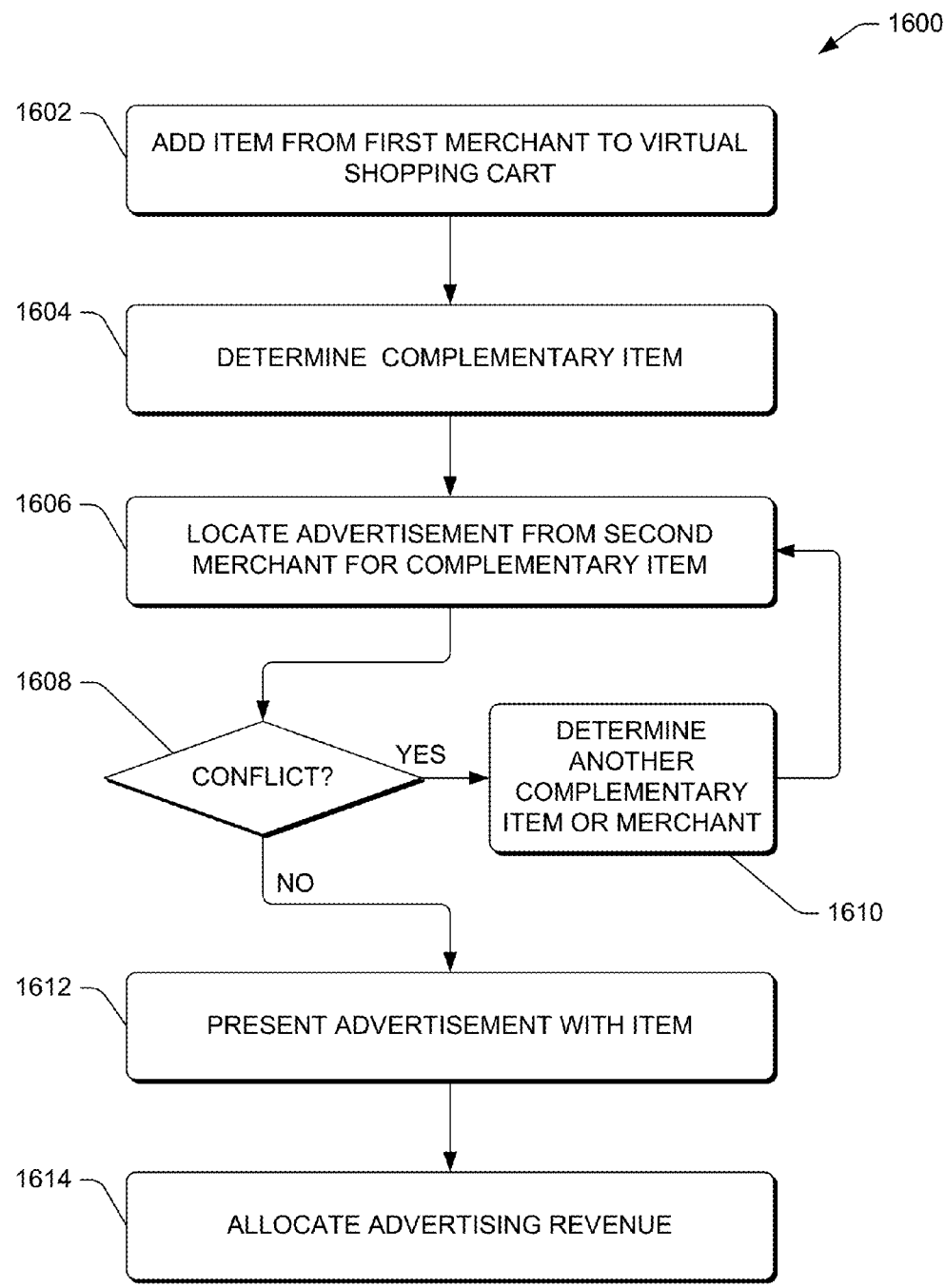
FIG. 16 is a flow diagram of an illustrative process of advertising an item based on an item in the cart.

Each of the respective modules to determine the complementary items 508, the recommendations 526, and the advertisement 518 are discussed in further detail in FIGS. 14-16.

FIG. 14 is a flow diagram of an illustrative process 1400 of recommending complementary items to a user based on an item in the cart 104. In accordance with various embodiments, the cart utilities module 126 and the complementary item component 724 may perform some or all of the operations of the process 1400.

At 1402, the cart utilities module 126 may receive an indication that the user 112 has selected an item offered by a merchant, such as the merchant 106(1).

At 1404, the cart utilities module 126 may add the selected item to the cart 104 associated with the user that may facilitate purchase of the item among other possible functions.

At 1406, the mapping module 706 may map the item to the common catalog via the process 800.

At 1408, the complementary item component 724 may determine whether the selected item is designated as a complementary item candidate. The complementary item candidate may be an item that includes complementary items which may be offered to the user 112 in an effort to "up-sell" the user to purchase the complementary items. For example, a television may include complementary items such as a surge protector, cables, a universal remote control, an extended warranty, a service plan, and so forth. When the selected item is not designated as a complementary candidate, the process 1400 may return to the operation 1402 and await another added item or other cart operation.

At 1410, the complementary item component 724 determine one or more items that have been deemed complementary to the selected item at least partly in response to the designating of the selected item as the complementary item candidate. Complementary items may be associated with the selected item via the common catalog 132. For example, the common catalog 132 may include a list of complementary items that correspond to each item that is designated as a complementary item candidate. The complementary items may be identified by merchants or by user activity, such as by the transactional analyzer 714 that may determine items (complementary items) that are often purchased with the complementary item candidate.

At 1412, the complementary item component 724 may rank the complementary items. The rank may be based on total quantity sold of the complementary items and/or a relative rank based on a total quantity sold of the complementary items when purchased with the selected item.

At 1414, the complementary item component 724 may list one or more complementary items with the selected item in the cart 104, such as shown in the complementary item subsection 506 in FIG. 5. In some embodiments, the complementary items may be offered by a second merchant (e.g., the merchant 106(2), etc.) and not available from the first merchant 106(1) that offers the selected item. In various embodiments, only complementary items from the merchant 106(1) may be offered to the user 112. Regardless, the cart 104 may facilitate purchase of the complementary items when selected for inclusion in the cart 104.

In accordance with some embodiments, the complementary item component 724 may enable one or more of the merchants 106 to offer item groups that include a complementary item candidate and complementary items. For example, the merchants 106 (individually or in combination) may offer a desktop computer, a monitor, and a printer as an item group. In some embodiments, the complementary item component 724 may enable cross-electronic marketplace promotions. For example, one or more of the items may be from different merchants such that the first merchant 106(1) offers the desktop computer and the second merchant 106(2) offers the monitor. In another example, the merchants 106 can offer "Buy X, get $Y off on product Z from merchant W". The promotion would be applicable only if item X and item Z are bought together and from the respective merchants using the cart 104. The item groups may include promotional pricing. The respective individual items may include different prices when purchased from the merchants 106 separate from the item group.

FIG. 15 is a flow diagram of an illustrative process 1500 of recommending items based on a transaction history of the user associated with the cart 104. In accordance with various embodiments, the cart utilities module 126 and the recommendation component 726 may perform some or all of the operations of the process 1500.

At 1502, the cart utilities module 126 may host the cart 104 associated with the user 112 that enables the user to store items that are selected from electronic marketplaces of various merchants 106. In various embodiments, the cart may enable purchase or acquisition of the selected items from the cart.

At 1504, the transactional analyzer 714 may track the items stored in or purchased from the virtual shopping cart associated with the user 112. For example, the transactional analyzer 714 may tally each item purchased by the user, viewed by the user and then added to the cart 104, or other user specific interactions with items via the cart. In some embodiments, the transactional analyzer may track items that the user 112 views or otherwise interacts with at the electronic marketplaces hosted by the various merchants. For example, the host 102 may use JavaScript modules that are loaded on the electronic marketplaces that enable tracking of user page views, and thus enable tracking user browsing history across the various electronic marketplaces.

At 1506, the recommendation component 726 may generate a recommendation profile for the user based on the tracked information collected from the transaction analyzer for the user 112. In some embodiments, the recommendation profile may be based on the tracking of the items stored in or purchased from the virtual shopping cart associated with the user.

At 1508, the recommendation component 726 may identify a recommendation item based at least in part on the recommendation profile of the user 112. For example, the user 112 may purchase an item X from an electronic marketplace (EM), which is tracked at the operation 1504. A relationship may be established by the recommendation component such as "other uses who bought X at EM(1), may also have bought item Y from EM(2)". Thus, the recommendation for the user 112 may be to purchase item Y at EM(2), or in some instances, at EM(1) or another of the electronic marketplaces of the merchants 106.

At 1510, the recommendation component 726 may present the recommendation item to the user, such as via the recommendation section 524 as shown in the interface 500 of FIG. 5.

FIG. 16 is a flow diagram of an illustrative process 1600 of advertising an item based on an item in the cart. In accordance with various embodiments, the cart utilities module 126 and the advertisement component 728 may perform some or all of the operations of the process 1600.

At 1602, the cart utilities module 126 may host the cart 104 associated with the user 112 that enables the user to store items that are selected from electronic marketplaces of various merchants. In some embodiments, the cart 104 may enable purchase of the selected items. The cart utilities module 126 may receive an indication that the user 112 has selected an item offered by a merchant, such as the first merchant 106(1). The cart utilities module 126 may add the item offered by the first merchant to the cart 104 associated with the user at least partly in response to the receiving of the indication.

At 1604, the advertisement component 728 may determine a complementary item based at least in part on the item added to the cart 104. The complementary item may be similar or the same as the complementary item 508 identified at the operations 1408. However, the complementary items at 1604 may also include item substitutes. For example, when the user selects a television, the complementary item may be another competing television, a television accessory, or another item associated with the television that may interest the user.

At 1606, the advertisement component 728 may locate an advertisement for the complementary item. The advertisement may be associated with the complementary items. In some embodiments, the advertisement may enable the user to add the complementary item into the cart 104 and/or direct the user to the electronic market 118 associated with the merchant.

At 1608, the advertisement component 728 may determine whether a conflict exists with the advertisements located at the operation 1606. In accordance with various embodiments, the conflict may be defined by the merchant offering the item selected at the operation 1602. A conflict may arise when the advertisement is for a competing product from another merchant that is also offered by the first merchant 106(1). In some embodiments, a conflict may arise when the advertisement is from another merchant than the first merchant 106(1).

At 1610, the advertisement component 728 may determine another complementary item or the same complementary item from a different merchant when a conflict is detected at the decision operation 1608.

At 1612, the advertisement component 728 may present the advertisement with the item. For example, the advertisement may be presented as shown in the advertisement section 516 of the interface 500 shown in FIG. 5.

At 1614, the advertisement component 728 may allocate advertising revenue. The revenue may be received by the provider of the advertisement in exchange for the presentation of the advertisement at the operation 1612. The revenue may be dispersed, in part, to a merchant that offers the selected item from the operation 1602. In this way, the first merchant 106(1) may benefit by enabling an item to have competing advertising by a second merchant. However, as discussed above with respect to the decision 1608, the first merchant may define a conflict scenario, which may block the advertisement when it creates a conflict as defined by the merchant (e.g., the first merchant).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
hosting a virtual shopping cart associated with a user, wherein the virtual shopping cart stores items that are chosen by the user from electronic marketplaces of various merchants;
tracking items acquired by the user from the various merchants, wherein the items acquired by the user are tracked through use of the virtual shopping cart associated with the user to create a transaction history in a user account of the user;
receiving, from the user, a designation of an additional account of an additional user that is different from the user and is to be combined with the user account of the user;
linking the additional account of the additional user to the user account of the user;
combining using a computer processor the transaction history of the user account and a transaction history of the additional user account based in part on the linking to create a compiled transaction history of a set of previously acquired items;
receiving an indication that the user has selected an item offered by a merchant;
adding the selected item offered by the merchant to the virtual shopping cart associated with the user at least partly in response to the receiving of the indication;
comparing the selected item to the set of previously acquired items in the compiled transaction history and determining that at least one previously acquired item from the set of previously acquired items is the same as the selected item or is determined to be similar to the selected item; and
designating the selected item as a duplicate item in response to a determination that the at least one previously acquired item from the set of previously acquired items in the compiled transaction history is the same as the selected item or is determined to be similar to the selected item.

2. The method as recited in claim 1, further comprising transmitting a message to the user indicating that the selected item is a duplicate item, and wherein the message includes transaction details of the at least one previously acquired item including at least a date of the respective transaction and a description of the at least one previously acquired item.

3. The method as recited in claim 2, further comprising querying attributes of the at least one previously acquired item, and wherein the message includes item attributes.

4. The method as recited in claim 3, wherein the item attributes include at least one technical specification of the at least one previously acquired item.

5. The method as recited in claim 1, wherein the comparing of the selected item to the set of previously acquired items includes comparing at least one of a model number, a primary function, or a description of the selected item to that of the set of previously acquired items.

6. The method as recited in claim 1, wherein the selected item is determined to be similar to the at least one previously acquired item when the selected item shares at least 90% of item attributes of the at least one previously acquired item.

7. One or more non-transitory computer-readable media storing computer-executable instructions that, when executed on one or more processors, performs acts comprising:
hosting a virtual shopping cart associated with a user, the virtual shopping cart storing items that are chosen from electronic marketplaces of multiple different merchants and facilitating purchase of each of the chosen items from the virtual shopping cart;
compiling a transaction history in a user account of items that the user has acquired from two or more of the electronic marketplaces of the multiple different merchants;
receiving, from the user, a designation of an additional account of an additional user that is different from the user and is to be combined with the user account of the user;
linking the additional account of the additional user to the user account of the user;
combining the transaction history of the user account and a transaction history of the additional user account based in part on the linking to create a compiled transaction history of a set of previously acquired items;
receiving an indication that the user has added a selected item into the virtual shopping cart;
comparing the selected item to the set of previously acquired items in the compiled transaction history and determining that at least one previously acquired item from the set of previously acquired items is the same as the selected item or is determined to be similar to the selected item; and
designating, the selected item as a duplicate item in response to a determination that the at least one previously acquired item from the set of previously acquired items in the compiled transaction history is the same as the selected item or is determined to be similar to the selected item.

8. The one or more non-transitory computer-readable media as recited in claim 7, wherein the compiling includes mapping the items the user has acquired to a common catalog of items to compile the transaction history of the acquired items.

9. The one or more non-transitory computer-readable media as recited in claim 8, wherein the acts further comprise mapping the selected item to the common catalog to enable the comparing of the selected item to the acquired items.

10. The one or more non-transitory computer-readable media as recited in claim 8, wherein the common catalog is selected from a catalog of one of the multiple different merchants or another merchant.

11. The one or more non-transitory computer-readable media as recited in claim 7, wherein the acts further comprise removing the selected item from the virtual shopping cart after the selected item is designated as the duplicate item.

12. The one or more non-transitory computer-readable media as recited in claim 7, wherein the acts further comprise:
designating the selected item as consumable or non-consumable;
refraining from the comparing the selected item with the set of previously acquired items in the compiled transaction history or refraining from designating the selected item as the duplicate item at least partly in response to the selected item being designated as consumable; and performing the comparing of the selected item with the set of previously acquired items in the compiled transaction history and the designating of the selected item as the duplicate item at least partly in response to the selected item being designated as non-consumable.

13. The one or more non-transitory computer-readable media as recited in claim 7, wherein the acts further comprise causing a display of the selected item with the at least one previously acquired item, the display including at least one attribute of the at least one previously acquired item.

14. The one or more non-transitory computer-readable media as recited in claim 13, wherein the at least one attribute includes a color or a version of the at least one previously acquired item.

15. The one or more non-transitory computer-readable media as recited in claim 7, wherein the selected item is determined to be similar to the at least one previously acquired item when the selected item shares at least 80% of item attributes of the at least one previously acquired item.

16. The one or more non-transitory computer-readable media as recited in claim 7, wherein the acts further comprise adding the selected item to the virtual shopping cart at least partly in response to the receiving of the indication, and wherein the designating the selected item as a duplicate item occurs prior to transmission of payment information from the user for the selected item.

17. A method comprising:
hosting a virtual shopping cart associated with a user, the virtual shopping cart storing items that are chosen from electronic marketplaces of multiple different merchants and facilitating purchase of each of the chosen items from the virtual shopping cart;
compiling a transaction history in a user account of items that the user has acquired from two or more of the electronic marketplaces of the multiple different merchants;
receiving, from the user, a designation of an additional account of an additional user that is different from the user and is to be combined with the user account of the user;
linking the additional account of the additional user to the user account of the user;
combining using a computer processor the transaction history of the user account and a transaction history of the additional user account based in part on the linking to create a compiled transaction history of a set of previously acquired items;
receiving an indication that the user has added a selected item into the virtual shopping cart;
comparing the selected item to the set of previously acquired items in the compiled transaction history and determining that at least one previously acquired item from the set of previously acquired items is the same as the selected item or is determined to be similar to the selected item; and
designating the selected item as a duplicate item in response to a determination that the at least one previously acquired item from the set of previously acquired items in the compiled transaction history is the same as the selected item or is determined to be similar to the selected item.

18. The method as recited in claim 17, wherein the comparing comprises:
determining a primary function of the selected item and a primary function of each of the respective previously acquired items from the set of previously acquired items; and
comparing the primary function of the selected item to the primary function of each of the respective previously acquired items from the set of previously acquired items.

19. The method as recited in claim 17, further comprising removing the selected item from the virtual shopping cart after the selected item is designated as the duplicate item.

20. The method as recited in claim 17, wherein the compiling includes mapping the acquired items from the multiple different merchants to a common catalog of items to compile the transaction history of the acquired items.

21. The method as recited in claim 20, further comprising mapping the selected item to the common catalog to enable the comparing of the selected item to the acquired items.

22. The method as recited in claim 1, wherein the selected item is selected from a different one of the electronic marketplaces than the items acquired by the user.

23. The one or more non-transitory computer-readable media as recited in claim 7, wherein the selected item is selected from a different one of the electronic marketplaces than the items that the user has acquired.

24. The method as recited in claim 1, wherein the comparing occurs after the adding the selected item and before payment for items in the virtual shopping cart, and wherein the designating the selected item as the duplicate item occurs within the virtual shopping cart of the user.

* * * * *